(12) United States Patent
Chosokabe et al.

(10) Patent No.: US 9,300,136 B2
(45) Date of Patent: Mar. 29, 2016

(54) ACTIVATION CONTROL APPARATUS, IMAGE PROCESSING APPARATUS, ACTIVATION CONTROL METHOD, AND ACTIVATION CONTROL PROGRAM STORAGE MEDIUM

(71) Applicants: Kiriko Chosokabe, Tokyo (JP); Mikio Nakajima, Kanagawa (JP); Tomoyuki Yamashita, Tokyo (JP)

(72) Inventors: Kiriko Chosokabe, Tokyo (JP); Mikio Nakajima, Kanagawa (JP); Tomoyuki Yamashita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 232 days.

(21) Appl. No.: 14/039,620

(22) Filed: Sep. 27, 2013

(65) Prior Publication Data

US 2014/0098395 A1   Apr. 10, 2014

(30) Foreign Application Priority Data

Oct. 10, 2012 (JP) ................................. 2012-225561

(51) Int. Cl.
*H02J 3/00* (2006.01)
*H04N 1/00* (2006.01)

(52) U.S. Cl.
CPC .............. *H02J 3/00* (2013.01); *H04N 1/00899* (2013.01); *H04N 1/00901* (2013.01); *H04N 1/00904* (2013.01); *Y10T 307/604* (2015.04)

(58) Field of Classification Search
CPC ... H02J 3/00; H04N 1/00899; H04N 1/00901; H04N 1/00904; Y10T 307/604
See application file for complete search history.

(56) References Cited

U.S. PATENT DOCUMENTS

2007/0200432 A1* 8/2007 Yano et al. ..................... 307/44

FOREIGN PATENT DOCUMENTS

| JP | 2007-221942 | 8/2007 |
|----|-------------|--------|
| JP | 2008-154356 | 7/2008 |

* cited by examiner

*Primary Examiner* — Iriana Cruz
(74) *Attorney, Agent, or Firm* — Oblon, McClelland, Maier & Neustadt, L.L.P.

(57) ABSTRACT

An activation control apparatus includes a voltage fluctuation obtainer to obtain voltage fluctuation amplitude of an external power source at a given voltage, the voltage fluctuation caused when activating an apparatus using the external power source; a voltage fluctuation detector to detect the voltage fluctuation of the external power source at the given voltage; an activation controller to determine whether the voltage fluctuation amplitude obtained by the voltage fluctuation obtainer at the given voltage of the external power source, detected by the voltage fluctuation detector, is within a preset allowable voltage fluctuation range, and to control activation of the apparatus using the external power source based on a result of the voltage fluctuation determination made by the activation controller.

10 Claims, 16 Drawing Sheets

* ALLOWABLE VOLTAGE FLUCTUATION IS SMALLER THAN $\varDelta V$

ACTIVATION CONTROL APPARATUS, IMAGE PROCESSING APPARATUS, ACTIVATION CONTROL METHOD, AND ACTIVATION CONTROL PROGRAM STORAGE MEDIUM

CROSS-REFERENCE TO RELATED APPLICATION

This application claims priority pursuant to 35 U.S.C. §119 to Japanese Patent Application No. 2012-225561, filed on Oct. 10, 2012 in the Japan Patent Office, the disclosure of which is incorporated by reference herein in its entirety.

BACKGROUND

1. Technical Field

The present invention relates to an activation control apparatus, an image processing apparatus, an activation control method, and an activation control program, and more particularly to an activation control apparatus, an image processing apparatus, an activation control method, and an activation control program that conduct activation control in view of voltage fluctuation of a power source caused by an apparatus and its peripheral apparatuses when activating the apparatus and its peripherals.

2. Background Art

Image processing apparatuses such as facsimile machines, copiers, printers, or multifunction peripherals (MFPs) and information processing apparatuses such as computers are typically supplied with power from external power sources. When a power switch of the apparatus is turned ON, a power unit of the apparatus is supplied with power from the external power source, and the power unit conducts various processes such as current rectification and voltage adjustment to the power supplied from the external power source, and then supplies power to each unit in the apparatus to conduct various operations.

When the power supply from the external power source is started by turning the power switch of the apparatus to ON from OFF, voltage of the external power source decreases, and this voltage decrease is referred to as voltage fluctuation hereinafter.

The voltage fluctuation may or may not affect operation of the apparatus supplied with power from the external power source. An allowable fluctuation range of power source voltage that does not affect apparatus operation varies depending on the apparatus, but typical allowable fluctuation ranges are known.

For example, when a fusing unit of an electrophotographic image forming apparatus is activated, more power is required in a short period of time to activate the image forming apparatus. In this case, the voltage of the external power source fluctuates during that short period of time.

In general, when one apparatus such as an image forming apparatus is activated, the voltage fluctuation of the external power source is within the allowable fluctuation range of power source voltage.

However, when a plurality of apparatuses is activated at the same time, such as the simultaneous activation of a plurality of apparatuses after a blackout or the simultaneous activation of a plurality of apparatuses by timer setting, the voltage fluctuation of the external power source may exceed the allowable fluctuation range, possibly causing apparatus malfunction.

In view of this problem, JP-2008-154356-A discloses an apparatus including an in-progress signal transmitting unit and an in-progress signal receiving unit. The in-progress signal transmitting unit transmits a signal indicating that activation is in progress, and the in-progress signal receiving unit determines whether a signal indicating that activation is in progress, transmitted from the in-progress signal transmitting unit of other apparatus, connected with each other by a power line, is received.

In JP-2008-154356-A, a signal indicating that one apparatus is being activated is transmitted to another apparatus connected via the power line, and an activation control procedure is conducted by activating the apparatuses one by one to reduce excessive power consumption.

In JP-2008-154356-A, apparatuses connected to the same external power source can be activated one by one to prevent excessive power consumption. However, the greater the number of apparatuses supplied with power from the same external power source, the longer the time required to complete the activation of all of the apparatuses, which is not convenient.

SUMMARY

In one aspect of the present invention, an activation control apparatus is devised. The activation control apparatus includes a voltage fluctuation obtainer to obtain voltage fluctuation amplitude of an external power source at a given voltage, the voltage fluctuation caused when activating a first apparatus using the external power source; a voltage fluctuation detector to detect the voltage fluctuation of the external power source at the given voltage; and an activation controller to determine whether the voltage fluctuation amplitude obtained by the voltage fluctuation obtainer at the given voltage of the external power source, detected by the voltage fluctuation detector, is within a preset allowable voltage fluctuation range, and to control activation of the first apparatus using the external power source based on the voltage fluctuation amplitude determination made by the activation controller.

In another aspect of the present invention, a method of controlling activation of an apparatus is devised. The method includes the steps of obtaining voltage fluctuation amplitude of an external power source at a given voltage, the voltage fluctuation caused when activating the apparatus using the external power source; detecting the voltage fluctuation of the external power source at the given voltage; determining whether the voltage fluctuation amplitude obtained in the obtaining step at the given voltage of the external power source, detected in the detecting step, is within a preset allowable voltage fluctuation range; and controlling activation of the apparatus using the external power source based on the voltage fluctuation determined in the determining step.

In another aspect of the present invention, a non-transitory computer-readable storage medium storing a program that, when executed by a computer having a processor, causes the computer to execute a method of controlling activation of an apparatus is devised. The method includes the steps of obtaining voltage fluctuation amplitude of an external power source at a given voltage, the voltage fluctuation caused when activating the apparatus using the external power source; detecting the voltage fluctuation of the external power source at the given voltage; determining whether the voltage fluctuation amplitude obtained in the obtaining step at the given voltage of the external power source, detected in the detecting step, is within a preset allowable voltage fluctuation range; and controlling activation of the apparatus using the external power source based on the voltage fluctuation determined in the determining step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
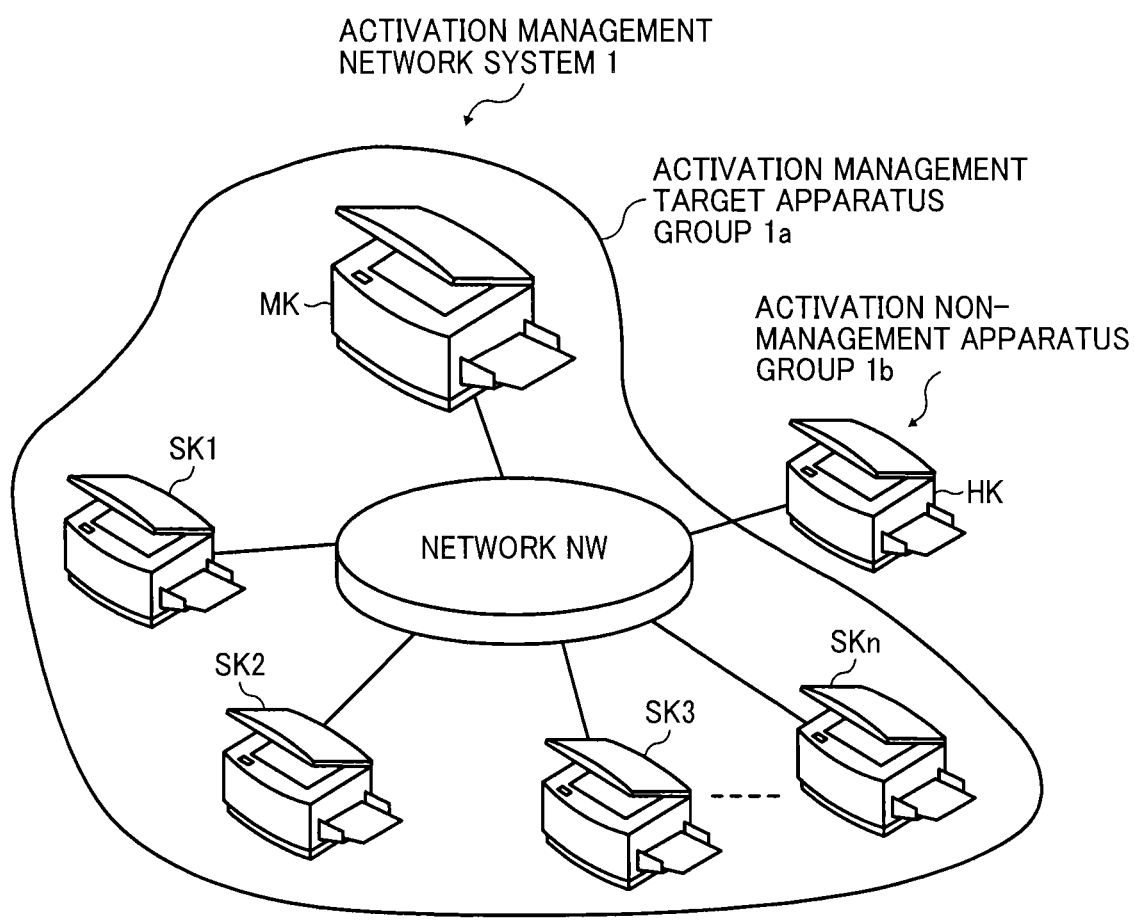
FIG. 1 is an example configuration of an activation management network system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have the same function, operate in a similar manner, and achieve a similar result. Referring now to the drawings, a description is given of an apparatus or system for activation control apparatus, an image processing apparatus, an activation control method and an activation control program according to an example embodiment hereinafter.

FIGS. 1 to 27 show an activation control apparatus, an image processing apparatus, an activation control method and an activation control program according to an example embodiment. FIG. 1 shows an example configuration of an activation management network system 1 applying an activation control apparatus, an image processing apparatus, an activation control method and an activation control program according to an example embodiment.

As shown in FIG. 1, the activation management network system 1 is configured with, for example, an activation management target apparatus group 1a and an activation non-management apparatus group 1b connected to a network NW such as a local area network (LAN).

The activation management target apparatus group 1a includes, for example, apparatuses MK, SK1 to SKn, which are targets for activation management. The activation non-management apparatus group 1b includes, for example, an activation non-management apparatus HK, which is not a target for activation management. The apparatuses MK, SK1 to SKn of the activation management target apparatus group 1a and the apparatus HK of the activation non-management apparatus group 1b may use the same external power source to operate each apparatus. Further, in an example configuration shown in FIG. 1, the activation non-management apparatus group 1b includes only one apparatus such as the apparatus HK, but the activation non-management apparatus group 1b can include a plurality of apparatuses.

In the activation management network system 1, for example, the apparatus MK can be used as a master apparatus, and the apparatuses SK1 to SKn can be used as slave apparatuses, in which the apparatus MK controls activation of the apparatus MK and the apparatuses SK1 to SKn. Hereinafter, the apparatus MK may be referred to as a master apparatus MK, and the apparatuses SK1 to SKn may be referred to as slave apparatuses SK1 to SKn, and each one of the apparatuses SK1 to SKn may be simply referred to as a slave apparatus as required.

The slave apparatuses SK1 to SKn in the activation management target apparatus group 1a may be, for example, apparatuses such as multifunction peripherals (MFP), printers, copiers, facsimile machines, computers or the like. The slave apparatuses SK1 to SKn use the same external power source with the master apparatus MK to activate and operate the slave apparatuses SK1 to SKn. The apparatus MK can control activation of the slave apparatuses SK1 to SKn from the power-OFF condition of the slave apparatuses SK1 to SKn.

Each of the slave apparatuses SK1 to SKn may be configured with hardware and program used for apparatuses in general, and includes an activation control program for an activation management target apparatus required for controlling the activation management target apparatus, and each of the slave apparatuses SK1 to SKn and can be activated and controlled under the control of the master apparatus MK to be described later.

The activation non-management apparatus HK in the activation non-management apparatus group 1b may be, for example, apparatuses such as multifunction peripherals (MFP), printers, copiers, facsimile machines, computers or the like. The activation non-management apparatus HK uses the same external power source with the master apparatus MK, but the activation non-management apparatus HK is not a target apparatus for the activation management by the master apparatus MK.

Figure 2:
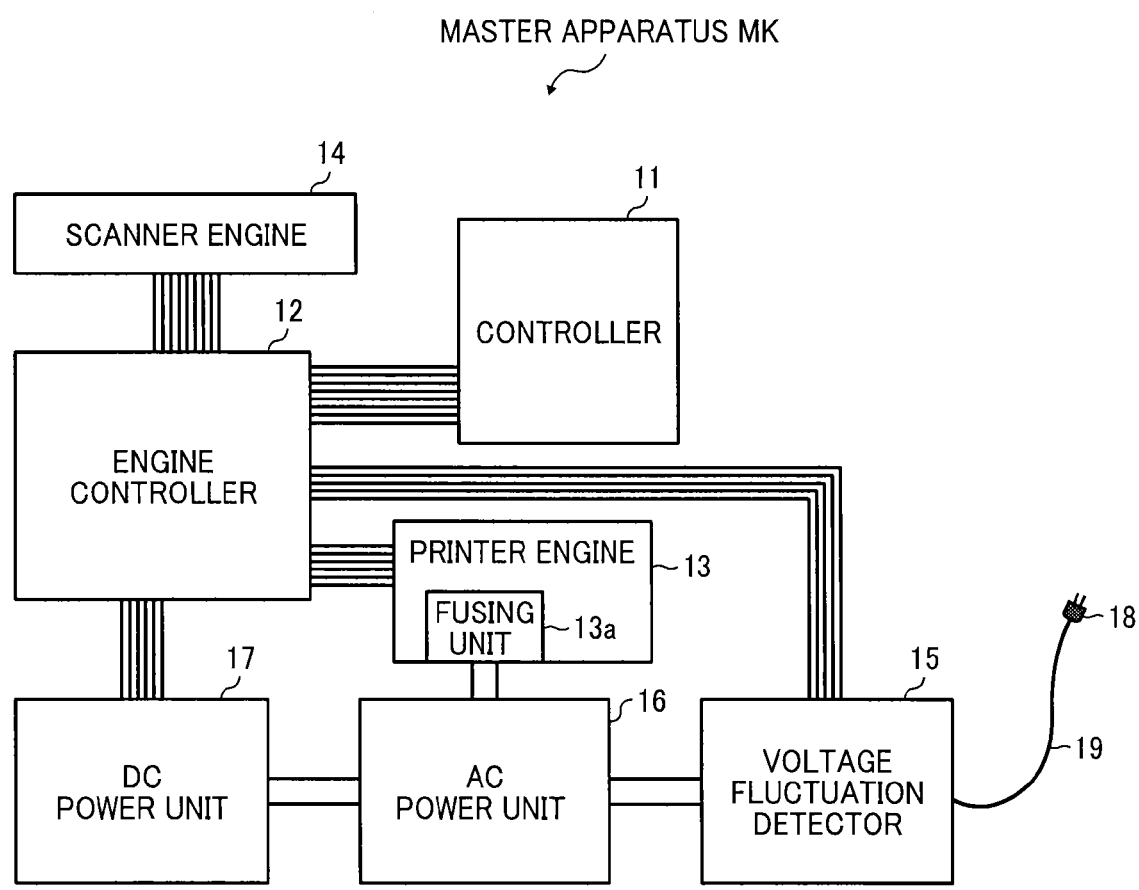
FIG. 2 is an example configuration of a master apparatus.

The master apparatus MK may be, for example, apparatuses such as multifunction peripherals (MFP), printers, copiers, facsimile machines, computers or the like. For example, the master apparatus MK is a multifunction peripherals (MFP) as shown in FIG. 2. The master apparatus MK includes, for example, a controller 11, an engine controller 12, a printer engine 13, a scanner engine 14, a voltage fluctuation detector 15, an alternating current (AC) power unit 16 and a direct current (DC) power unit 17, and further includes, for example, a network interface (I/F), an operation display unit or the like, which may be required for the master apparatus MK.

The voltage fluctuation detector 15 is connected with, for example, a power cord 19 having a plug 18 on its one end. By inserting the plug 18 to a socket provided for a power supply line of an external power source such as an AC power source (e.g., commercial power source), a given voltage (e.g., AC 100V) can be supplied from the external power source.

The voltage fluctuation detector 15 detects the voltage of the external power source supplied to the socket, inserted with the plug 18, from the external power source at a given timing, and outputs a voltage detection result to the engine controller 12. Further, the power from the external power source is supplied to the AC power unit 16 via the voltage fluctuation detector 15. The voltage fluctuation detector 15 can function as a detector that detects voltage fluctuation amplitude of the external power source.

The AC power unit 16 supplies the power from the external power source to each unit such as a fusing unit 13a of the printer engine 13 that requires AC power, in which the power is supplied via the voltage fluctuation detector 15. Further, the AC power unit 16 supplies the power to DC power unit 17.

The DC power unit 17 includes a current rectifier to rectify the power of external power source supplied from the AC power unit 16, and smoothes the power to various voltages (i.e., voltage adjustment), and then supplies direct current (DC) power of various voltages to each unit in the master apparatus MK.

The engine controller 12 is connected to the printer engine 13 and the scanner engine 14, and also connected to the controller 11. Under the control of the controller 11, the engine controller 12 controls operations of the printer engine 13 and the scanner engine 14.

The printer engine 13 is a printer engine employing the electrophotography that forms an image on a recording medium of sheet type such as paper and film (hereinafter, sheet), and the printer engine 13 includes parts to output images on a sheet based on image data using the electrophotography such as a photoconductor, a charger, an optical writing unit, a development unit, a transfer unit, a cleaning unit and the fusing unit 13a. By using video signals and control signals transmitted from the engine controller 12, the printer engine 13 activates the optical writing unit to form a latent image on the photoconductor charged by the charger, and supplies toner to the photoconductor using the development unit to develop the latent image as toner image. The printer engine 13 controls a feeding operation of sheets from a sheet feed unit to a space between the photoconductor and the transfer unit. The transfer unit transfers toner image from the photoconductor to the sheet. The sheet transferred with toner image is then transported to the fusing unit 13a. The fusing unit 13a applies heat and pressure to fuse the toner image on the sheet to form an image.

The fusing unit 13a includes, for example, a fusing roller, a pressure roller, a fusing heater, a thermistor and a power control unit of the fusing unit 13a. The fusing roller is rotatable by a driver. The pressure roller, pressed to the fusing roller with a given pressure, is rotatable with the fusing roller. The fusing heater is supplied with current to heat the fusing roller. The thermistor detects surface temperature of the fusing roller. The sheet is sandwiched between the fusing roller, heated at a given fusing temperature by the fusing heater, and the pressure roller, and heated and pressed to fuse the toner image on the sheet.

Based on the surface temperature of the fusing roller detected by thermistor, the engine controller 12 controls current supply to the fusing heater using the power control unit of the fusing unit 13a, in which the engine controller 12 controls the fusing roller at a given fusing temperature when a fusing operation is conducted, and the fusing roller at a given standby temperature when the fusing unit 13a is at a standby mode.

The power control unit of the fusing unit 13a is supplied with the power of external power source from the AC power unit 16, and the AC power unit 16 supplies the power of external power source to the power control unit of the fusing unit 13a when a power switch of the master apparatus MK is turned ON. Further, to be described later, the engine controller 12 controls activation of the fusing unit 13a, and controls current supply to the fusing heater of the fusing unit 13a.

Further, the scanner engine 14 includes, for example, a line image sensor using a charge coupled device (CCD), an analog/digital (A/D) converting circuit and a drive circuit to drive these units, and typically, an automatic document feeder (ADF). A plurality of document sheets can be set on the ADF. The ADF feeds the set document sheets one by one to a document scan position of the scanner engine 14. Under the control of the engine controller 12, the scanner engine 14 is operated to scan the document fed from the ADF in a main scanning direction and a sub-scanning direction, in which an image is scanned with a given resolution level based on density information of document, and, for example, image data of RGB having a given bit (e.g., eight bits) is generated and outputs to the engine controller 12. Further, the scanner engine 14 can use other than the CCD. For example, the scanner engine 14 can use a contact image sensor (CIS), complementary metal oxide semiconductor (CMOS) or the like.

The controller 11 includes, for example, a central processing unit (CPU), a read only memory (ROM), a random access memory (RAM), a non-volatile memory such as a hard disk. Based on the program stored in the ROM, the controller 11 uses the RAM as a working memory, and controls each unit in the master apparatus MK to conduct various operations using the master apparatus MK.

The engine controller 12 includes, for example, an engine CPU, a ROM, a RAM, and a non-volatile memory. Based on the program stored in the ROM, the engine controller 12 uses the RAM as a working memory, and controls the printer engine 13, the scanner engine 14 and a facsimile unit to conduct various operations for image processing.

Figure 3:
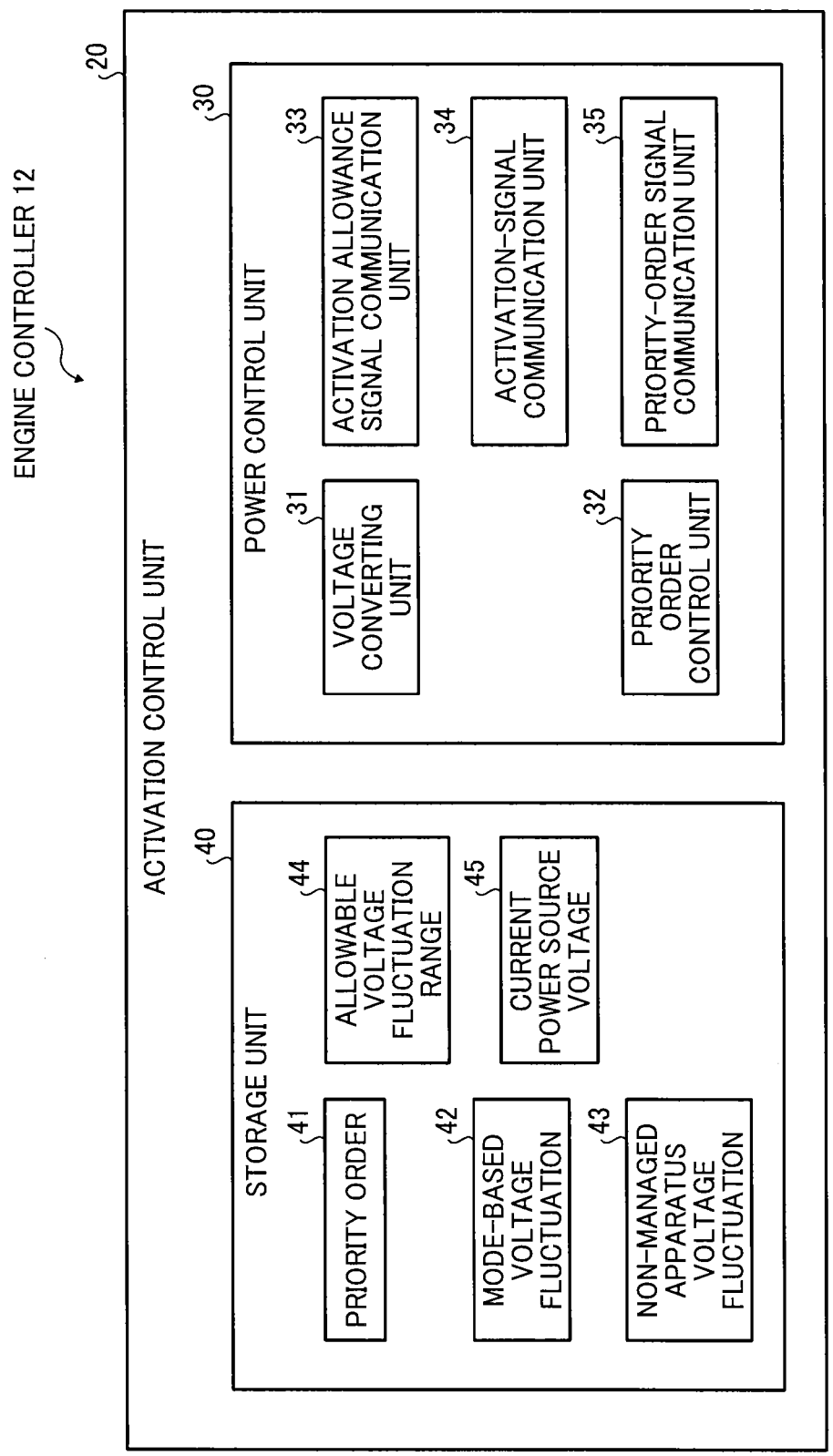
FIG. 3 is a functional block diagram of an engine controller.

Further, by installing the activation control program according to an example embodiment in the ROM, the engine controller 12 can be configured as an activation control unit 20 or activation control apparatus 20 as shown in FIG. 3. The activation control unit 20 includes, for example, a power control unit 30 and a storage unit 40.

As for the master apparatus MK, the activation control program for executing the activation control method according to an example embodiment can be provided to the programmable device using any storage medium, carrier medium, carrier means, or digital data carrier for storing processor readable code such as a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), flash memory, a memory card or stick such as USB memory, a memory chip, a mini disk (MD), a secure digital (SD) card, a magneto optical disc (MO), magnetic tape, a hard disk in a server, a solid state memory device or the like, but not limited these. To be described later, the master apparatus MK can be configured, for example, as an image processing apparatus having the engine controller 12 (or activation control apparatus) that conducts the activation promptly in the allowable voltage fluctuation range of power source using the activation control method. The activation control program can be described by object-oriented programming languages such as Assembler, C, C++, Java (registered trademark), JavaScript (registered trademark), Perl, Ruby, or legacy programming languages such as machine language, assembler language to control functional units used for the apparatus or system, and can be stored in the above described storage.

Further, in the above description, the activation control unit 20 is configured in the engine controller 12 but not limited hereto. For example, the activation control unit 20 can be configured in the controller 11. Hereinafter, the activation control unit 20 is configured in the engine controller 12. FIG. 3 shows the activation control unit 20 configured in the engine controller 12 of the master apparatus MK. Further, the activation control unit 20 can be configured in the slave apparatuses SK1 to SKn by installing the activation control program, required for the activation management target apparatus, in the slave apparatuses SK1 to SKn. Because the activation of slave apparatuses SK1 to SKn can be managed by the master apparatus MK, function units required only for the controlled apparatus or activation management target apparatus is configured for the activation control unit 20 in the slave apparatuses SK1 to SKn.

The power control unit 30 is configured using a central processing unit (CPU). As shown in FIG. 3, the power control unit 30 includes, for example, a voltage converting unit 31, a priority order control unit 32, an activation allowance signal communication unit 33, an activation-signal communication unit 34 and a priority-order signal communication unit 35.

The storage unit 40 is configured using a non-volatile memory. The storage unit 40 stores priority order 41, mode-based voltage fluctuation 42, non-managed apparatus voltage fluctuation 43, allowable voltage fluctuation range 44 and current power source voltage 45.

The voltage of external power source, which is an analog voltage, is input and detected by the voltage fluctuation detector 15. The voltage converting unit 31 of the power control unit 30 converts analog voltage signal to digital voltage signal that can be processed in the activation control unit 20, which is a conversion process from the analog to digital voltage signal. Therefore, the voltage fluctuation detector 15 and the voltage converting unit 31 can collectively function as a voltage fluctuation detector that can detect fluctuation of voltage of the external power source.

Further, when the master apparatus MK and the slave apparatuses SK1 to SKn that use the same external power source are activated, the voltage fluctuation detector 15 detects voltage fluctuation amplitude of the external power source, and the voltage converting unit 31 converts analog voltage fluctuation amplitude to digital voltage fluctuation amplitude that can be processed in the activation control unit 20, which is a conversion process from analog to digital voltage signal. Therefore, the voltage fluctuation detector 15 and the voltage converting unit 31 can collectively function as a voltage fluctuation obtainer that can obtain voltage fluctuation amplitude of the external power source caused by activating the master apparatus MK and the slave apparatuses SK1 to SKn using the external power source.

Based on a value of voltage fluctuation amplitude converted by the voltage converting unit 31, and the mode-based voltage fluctuation 42 stored in the storage unit 40 for each one of a plurality of activation modes of the master apparatus MK to be described later, the priority order control unit 32 controls the activation modes and the priority order of activation target apparatus to control the activation of the master apparatus MK and the slave apparatuses SK1 to SKn. Therefore, the priority order control unit 32 can function as an activation controller.

The activation allowance signal communication unit 33 is used to communicate activation allowance signal between the master apparatus MK which conducts an activation management, and the slave apparatuses SK1 to SKn used as the activation management target, wherein the master apparatus MK and the slave apparatuses SK1 to SKn are connected to the network NW. Specifically, the master apparatus MK transmits the activation allowance signal using the activation allowance signal communication unit 33, and each of the slave apparatuses SK1 to SKn receives the activation allowance signal using the activation allowance signal communication unit 33 of each of the slave apparatuses SK1 to SKn.

The master apparatus MK can transmit the activation allowance signal to one or more of the slave apparatuses SK1 to SKn, which are allowed to be activated, via the network NW. Upon receiving the activation allowance signal, one or more of the slave apparatuses SK1 to SKn can be activated based on the determined activation mode using the external power source.

When one or more of the slave apparatuses SK1 to SKn receive the activation allowance signal and start the activation, the activation-signal communication unit 34 of one or more of the slave apparatuses SK1 to SKn start the transmission of an activation signal to the master apparatus MK via the network NW, and when the slave apparatuses SK1 to SKn complete the activation, the activation-signal communication unit 34 stops the transmission of activation signal to the master apparatus MK. The master apparatus MK can confirm that the slave apparatuses SK1 to SKn, which are allowed to be activated, are in activation by receiving this activation signal.

The priority-order signal communication unit 35 can be used to exchange or communicate information between the master apparatus MK and the slave apparatuses SK1 to SKn, in which priority order information of the activation modes determined by the priority order control unit 32, information of the activation modes and priority order of the activation modes included in each of the slave apparatuses SK1 to SKn, and amount of voltage fluctuation corresponding to each of the activation modes of the slave apparatuses SK1 to SKn are exchanged or communicated between the master apparatus MK and the slave apparatuses SK1 to SKn. Therefore, the priority-order signal communication unit 35 can also function as a voltage fluctuation obtainer to obtain voltage fluctuation information from the slave apparatuses SK1 to SKn.

As described above, the storage unit 40 stores the priority order 41, the mode-based voltage fluctuation 42, the non-managed apparatus voltage fluctuation 43, the allowable voltage fluctuation range 44 and the current power source voltage 45 by dividing a storage area for each information.

The priority order 41 of the master apparatus MK includes activation modes and priority order information of the activation modes set for the master apparatus MK and the slave apparatuses SK1 to SKn. The priority order 41 of each of the slave apparatuses SK1 to SKn includes activation modes and priority order information of the activation modes set for each of the slave apparatuses SK1 to SKn. The priority order will be described later.

The mode-based voltage fluctuation 42 includes information of voltage fluctuation to the voltage of external power source caused by each activation mode. The mode-based voltage fluctuation 42 of the master apparatus MK includes information of voltage fluctuation to the voltage of external power source caused by each activation mode of the master apparatus MK, and information of voltage fluctuation to the voltage of external power source caused by activations mode of the slave apparatuses SK1 to SKn.

The mode-based voltage fluctuation 42 of the slave apparatuses SK1 to SKn includes information of voltage fluctuation to the voltage of external power source caused by activations mode of the slave apparatuses SK1 to SKn.

The non-managed apparatus voltage fluctuation 43 includes information of voltage fluctuation caused to the voltage of external power source when the apparatus HK of the activation non-management apparatus group 1b is activated.

The allowable voltage fluctuation range 44 includes information of allowable voltage fluctuation range that does not cause abnormality such as malfunction to the master apparatus MK, the slave apparatuses SK1 to SKn and the activation non-management apparatus HK when the master apparatus MK, the slave apparatuses SK1 to SKn and the activation non-management apparatus HK are activated.

The current power source voltage 45 is information of current voltage of the external power source. This current voltage can be obtained by waiting stabilization of the voltage fluctuation detected by the voltage fluctuation detector 15, in which detected voltage is converted to a digital voltage signal, and then the digital voltage signal is converted using the voltage converting unit 31 by waiting stabilization of the voltage fluctuation. This converted digital voltage signal can be used as current voltage of the external power source, which is currently detected.

A description is given of an effect of the configuration of an example embodiment. The activation management network system 1 according to an example embodiment can activate the master apparatus MK and the slave apparatuses SK1 to SKn promptly within the allowable fluctuation range of power source such as external power source.

A description is given of a process of activation control of the master apparatus MK with reference to FIGS. 4 to 8.

Figure 4:
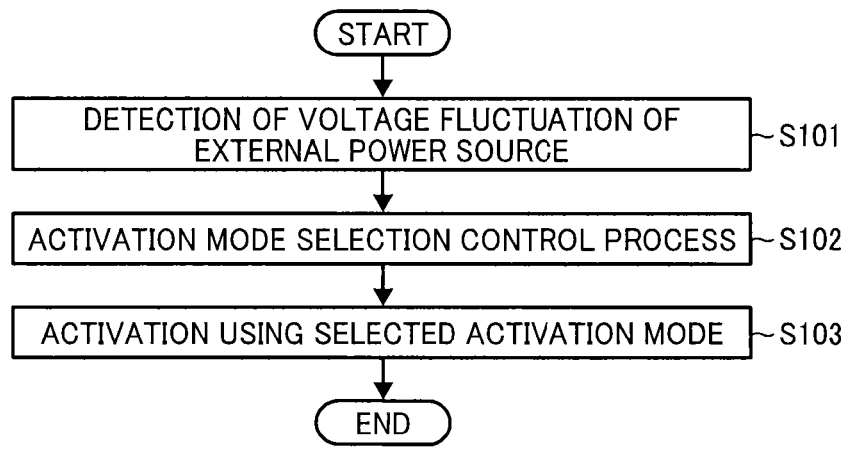
FIG. 4 is a flowchart of a process of activation control at a master apparatus.

A description is given of activation control process of the master apparatus MK with reference to FIG. 4. The master apparatus MK conducts a detection process of voltage fluctuation of an external power source, in which fluctuation amplitude of voltage of the external power source (hereinafter, external power source voltage) is detected (step S101). Then, the master apparatus MK conducts an activation mode selection control process (step S102). Upon completing the activation mode selection control process, the master apparatus MK conducts an activation using the selected activation mode, and ends the activation control process (step S103).

Figure 5:
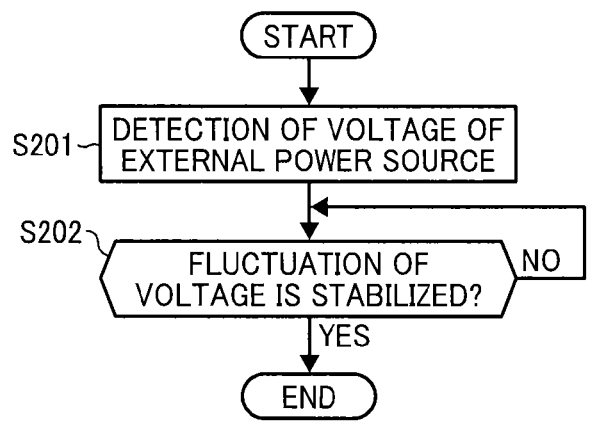
FIG. 5 is a flowchart of a detection process of voltage fluctuation of an external power source.

Specifically, the master apparatus MK conducts the detection process of voltage fluctuation of the external power source at step S101 as shown in FIG. 5.

The master apparatus MK starts the detection of voltage of external power source using the voltage fluctuation detector 15 (step S201). The voltage converting unit 31 configured in the engine controller 12 converts an input analog voltage signal of the external power source, detected by the voltage fluctuation detector 15, to a digital voltage signal that can be processed by the activation control unit 20, and checks whether the digital voltage signal is stabilized, which means it is checked whether the fluctuation of voltage is stabilized within a given range (step S202).

The master apparatus MK waits until the value of digital voltage signal, detected and converted by the voltage fluctuation detector 15, is stabilized (step S202). When the value of digital voltage signal is stabilized, the value of digital voltage signal is stored in the storage unit 40 as the current power source voltage 45.

Figure 6:
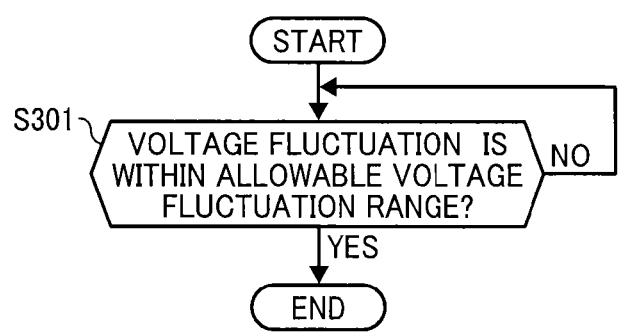
FIG. 6 is a flowchart of a process of activation mode selection control when a single activation mode is set.
Figure 7:
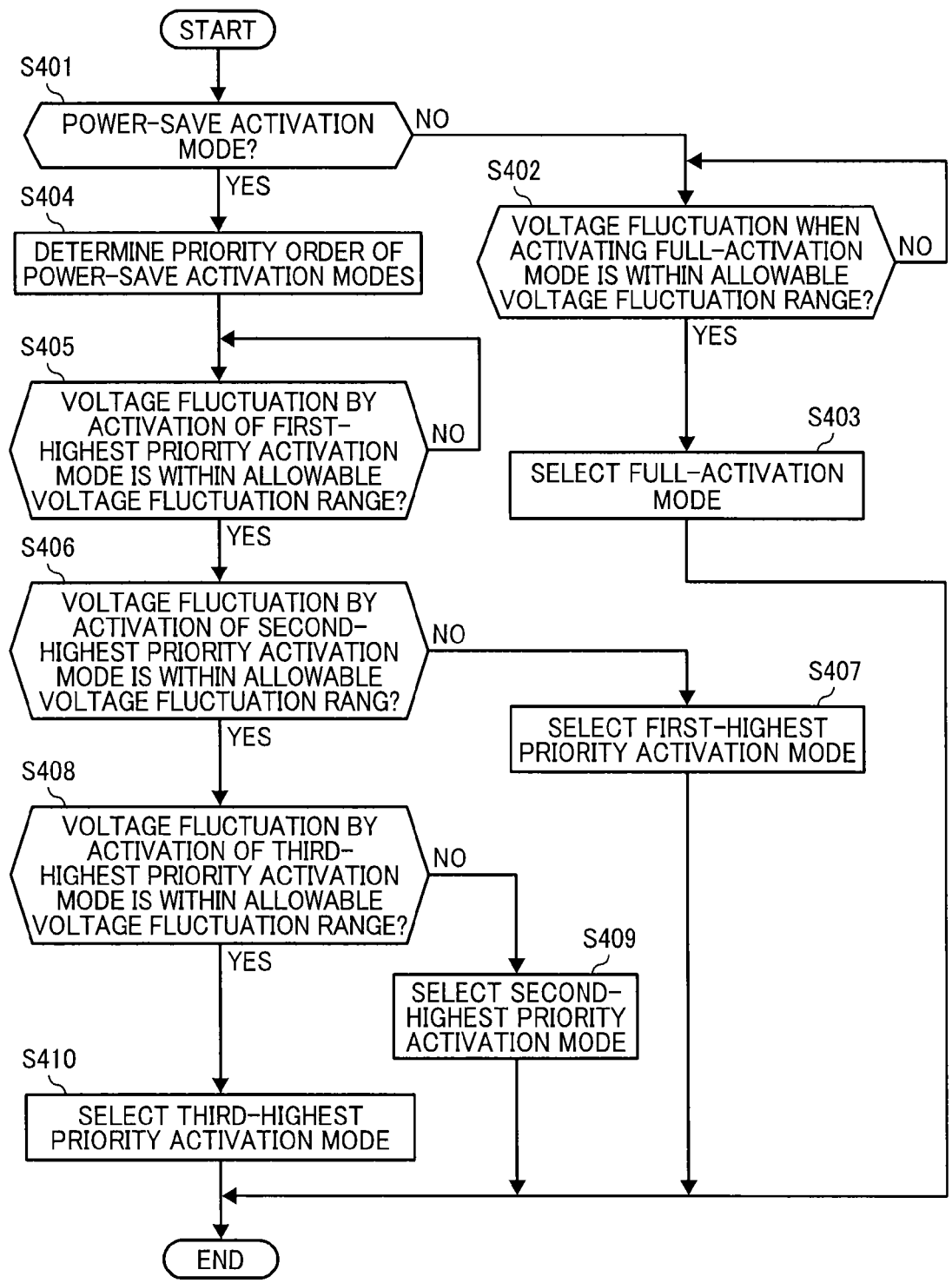
FIG. 7 is a flowchart of a process of activation mode selection control when a plurality of activation modes is set.

Further, the master apparatus MK conducts the activation mode selection control process at step S102 (FIG. 4) as shown in FIG. 6 or FIG. 7.

When the activation mode includes single mode, the master apparatus MK conducts the activation mode selection control process as shown in FIG. 6.

Specifically, when the activation mode includes the single mode, the master apparatus MK checks whether the voltage fluctuation of external power source is within the allowable voltage fluctuation range 44 stored in the storage unit 40 (step S301) when the master apparatus MK is to be activated using the single activation mode as shown in FIG. 6 under the current power source voltage 45, obtained by the detection process of voltage fluctuation of the external power source at step S101 (FIG. 4).

If the activation is conducted using the single activation mode under the current power source voltage 45 when the voltage fluctuation of the external power source is not within the allowable voltage fluctuation range 44 (step S301: NO), there is a concern that abnormality such as malfunction may occur to one apparatus such as the master apparatus MK and other apparatus using the same external power source, and therefore the master apparatus MK is does not issue an activation-allowance.

If the voltage fluctuation of the external power source is within the allowable voltage fluctuation range 44 (step S301: YES), the master apparatus MK determines that abnormality such as malfunction may not occur even if the activation is conducted using the single activation mode under the current power source voltage 45, and the master apparatus MK starts an activation using the single activation mode.

Further, when the activation mode includes a plurality of activation modes, the master apparatus MK conducts the activation mode selection control process as shown in FIG. 7.

Figure 8:
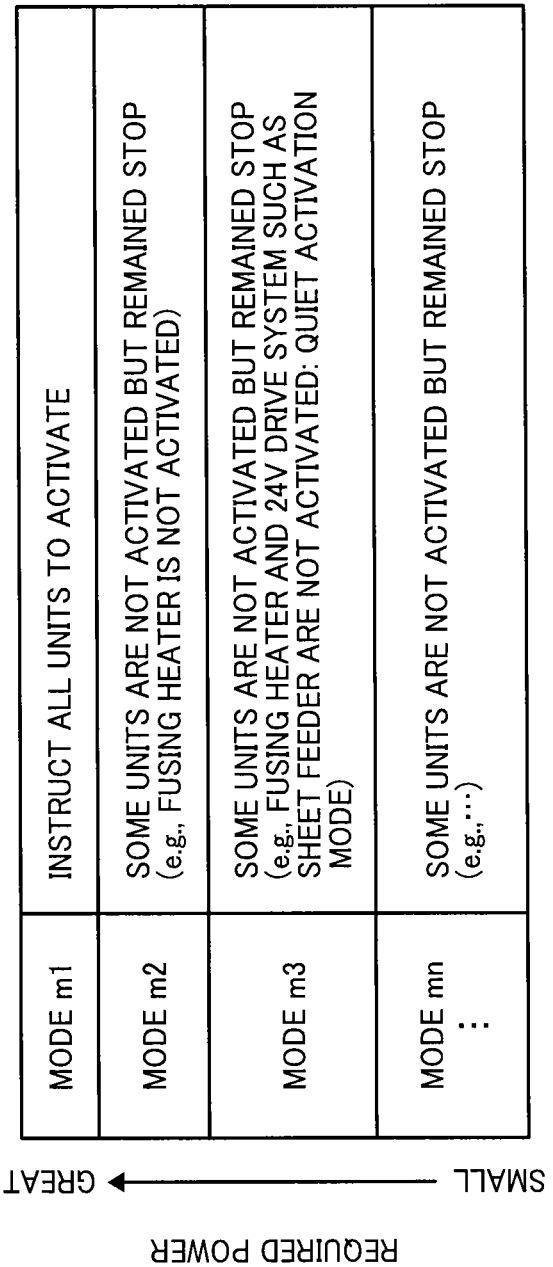
FIG. 8 shows examples of activation modes.

For example, the master apparatus MK can be set with, for example, a plurality of activation modes shown in FIG. 8, such as activation mode m1 (or full-activation mode m1) and a plurality of power-save activation modes m2 to mn. For example, the full-activation mode m1 is an activation mode that activates all units at the same time so that all of operations including the fusing unit 13a requiring the highest power for the master apparatus MK can be conducted promptly. Each of the power-save activation modes m2 to mn is an activation mode that a part of units are not activated while operation-required units are activated among units included in the master apparatus MK, and the level of activation power increases from the power-save activation mode "mn" toward the power-save activation mode "m2" in an example case of FIG. 8. The master apparatus MK can include a plurality of activation modes such as the power-save activation modes m2 to mn as above described, but the master apparatus MK may include single power-save activation mode due to some factors. Further, in an example embodiment, the slave apparatuses SK1 to SKn can set with the activation modes m1 to mn similar to the master apparatus MK.

The selection of activation modes m1 to mn can be conducted by a user's setting or by administrator's setting. For example, the activation modes m1 to mn for the slave apparatuses SK1 to SKn can be collectively set by the master apparatus MK.

Further, when controlling the activation of each of the slave apparatuses SK1 to SKn, the power-save activation modes m2 to mn can be used as activation modes that can activate a greater number of the slave apparatuses SK1 to SKn in a short period of time.

When the master apparatus MK having the activation modes m1 to mn conducts the activation mode selection control process at step S102 (FIG. 4), it is checked whether the activation mode is one of the power-save activation modes m2 to mn (step S401).

If it is checked that the activation mode is not the power-save activation modes m2 to mn, but the activation mode is the full-activation mode m1 (step S401: NO), it is checked whether the voltage fluctuation of external power source when activated by the full-activation mode m1 is within the allowable voltage fluctuation range 44 stored in the storage unit 40 (step S402) under the current power source voltage 45, obtained by the detection process of voltage fluctuation of the external power source at step S101 (FIG. 4). The master apparatus MK determines the voltage fluctuation of external power source under the current power source voltage 45 by referring the mode-based voltage fluctuation 42 in the storage unit 40.

If the activation is conducted using the concerned activation mode under the current power source voltage 45 when the voltage fluctuation of external power source caused by activating the master apparatus MK using the full-activation mode m1 is not within the allowable voltage fluctuation range 44 under the current power source voltage 45 (step S402: NO), there is a concern that abnormality such as malfunction may occur to the apparatus, and therefore the master apparatus MK does not issue an activation-allowance. Then, under the detected current power source voltage 45, the master apparatus MK waits until the voltage fluctuation of external power source caused by the activation by the full-activation mode m1 becomes within the allowable voltage fluctuation range 44.

If the voltage fluctuation of external power source caused by activation using the full-activation mode m1 is within the allowable voltage fluctuation range 44 (step S402: YES) under the current power source voltage 45, the master apparatus MK determines that abnormality such as malfunction may not occur even if activation is conducted using the full-activation mode m1 under the current power source voltage 45, and selects the full-activation mode m1 as the activation mode, and ends the activation mode selection control process (step S403).

If the activation mode is one of the power-save activation modes m2 to mn (step S401: YES), the master apparatus MK determines priority order of the power-save activation modes m2 to mn among the power-save activation modes m2 to mn, in which the priority order is set in the order from the power-save activation mode mn using the smallest activation power toward other power-save activation modes using activation power incrementally increased from the smallest to the greatest (step S404). In this case, the power-save activation mode "mn" may be referred to as the first-highest priority power-save activation mode mn, which is a power-save activation mode using the smallest power when activated.

It is checked whether the voltage fluctuation of external power source caused by activating the first-highest priority power-save activation mode mn is within the allowable voltage fluctuation range 44 stored in the storage unit 40 (step S405) under the current power source voltage 45, obtained by the detection process of voltage fluctuation of external power source at step S101 of FIG. 4.

In an example case shown in FIG. 8, the priority order of the power-save activation modes may be set as follows. For example, the master apparatus MK determines the power-save activation mode m2 is an activation mode using the greatest activation power and having the lowest priority order (third-highest priority), and the power-save activation mode mn is an activation mode using the smallest activation power and having the highest priority order (first-highest priority) among the power-save activation modes m2 to mn. Further, although FIG. 8 shows a case that the power-save activation mode includes three power-save activation modes m2, m3, and m4, but the number of power-save activation modes is not limited to three modes, but can be other numbers such as two, four or more, as required.

If the activation is conducted using the first-highest priority power-save activation mode when the voltage fluctuation of external power source caused by the activating the first-highest priority power-save activation mode (e.g., power-save activation mode m4 in FIG. 8) is not within the allowable voltage fluctuation range 44 under the current power source voltage 45 (step S405: NO), there is a concern that abnormality such as malfunction may occur. Further, because a power-save activation mode using the activation power smaller than the first-highest priority power-save activation mode does not exist, the master apparatus MK does not issue the activation-allowance. Then, under the detected current power source voltage 45, the master apparatus MK waits until the voltage fluctuation of external power source caused by activating the first-highest priority power-save activation mode becomes within the allowable voltage fluctuation range 44.

If the voltage fluctuation of external power source caused by activating the first-highest priority power-save activation mode (e.g., power-save activation mode m4 in FIG. 8) is within the allowable voltage fluctuation range 44 under the current power source voltage 45 (step S405: YES), the master apparatus MK determines that abnormality such as malfunction may not occur even if activation is conducted using the first-highest priority power-save activation mode under the current power source voltage 45.

Then, it is checked whether the voltage fluctuation of external power source caused by activating the second-highest priority power-save activation mode having a priority right after the first-highest priority power-save activation mode is within the allowable voltage fluctuation range 44 (step S406).

If the voltage fluctuation of external power source caused by activating the second-highest priority power-save activation mode is not within the allowable voltage fluctuation range 44 (step S406: NO), the first-highest priority power-save activation mode is selected as the activation mode (step S407), and the activation mode selection control process ends.

If the voltage fluctuation of external power source caused by activating the second-highest priority power-save activation mode (e.g., power-save activation mode m3 in FIG. 8) is within the allowable voltage fluctuation range 44 (step S406: YES), the master apparatus MK determines that abnormality such as malfunction may not occur even if the activation is conducted using the second-highest priority power-save activation mode under the current power source voltage 45.

Then, it is checked whether the voltage fluctuation of external power source caused by activating the third-highest priority power-save activation mode having a priority right after the second-highest priority power-save activation mode (i.e., two levels lower than first-highest priority) is within the allowable voltage fluctuation range 44 (step S408).

If the voltage fluctuation of external power source caused by activating the third-highest priority power-save activation mode having a priority after the first-highest priority power-save activation mode for two levels (e.g., power-save activation mode m2 in FIG. 8) is not within the allowable voltage fluctuation range 44 (step S408: NO), the master apparatus MK selects the second-highest priority power-save activation mode having a priority right after the first-highest priority as the activation mode, and ends the activation mode selection control process (step S409).

If the voltage fluctuation of external power source caused by activating the third-highest priority power-save activation mode (i.e., two levels lower than first-highest priority) is within the allowable voltage fluctuation range 44 (step 408: YES), the master apparatus MK selects the third-highest priority power-save activation mode as the activation mode, and ends the activation mode selection control process (step S410) because a power-save activation mode having a priority order lower than the third-highest priority power-save activation mode does not exist in this example case.

FIG. 7 shows one case that the master apparatus MK can be set with, for example, the power-save activation modes m2, m3, m4 as an example of the power-save activation modes m2 to mn of FIG. 8, in which the priority order is set in the order from m4 to m3 to m2, in which the highest priority order is set for the power-save activation mode m4 (i.e., priority order of m4->m3->m2), and then it is checked sequentially whether the voltage fluctuation of external power source caused by each of the activation modes is within the allowable voltage fluctuation range 44 under the current power source voltage 45, and any one of the power-save activation modes m4, m3 and m2 can be selected as the activation mode.

In the activation management network system 1, as above described, the master apparatus MK can control the activation of the master apparatus MK, in which the master apparatus MK becomes a master with respect to the slave apparatuses SK1 to SKn included in the activation management target apparatus group 1a as slaves, and controls the activation of the slave apparatuses SK1 to SKn. A description is given of activation control of the slave apparatuses SK1 to SKn with reference to FIGS. 9 to 27.

Figure 9:
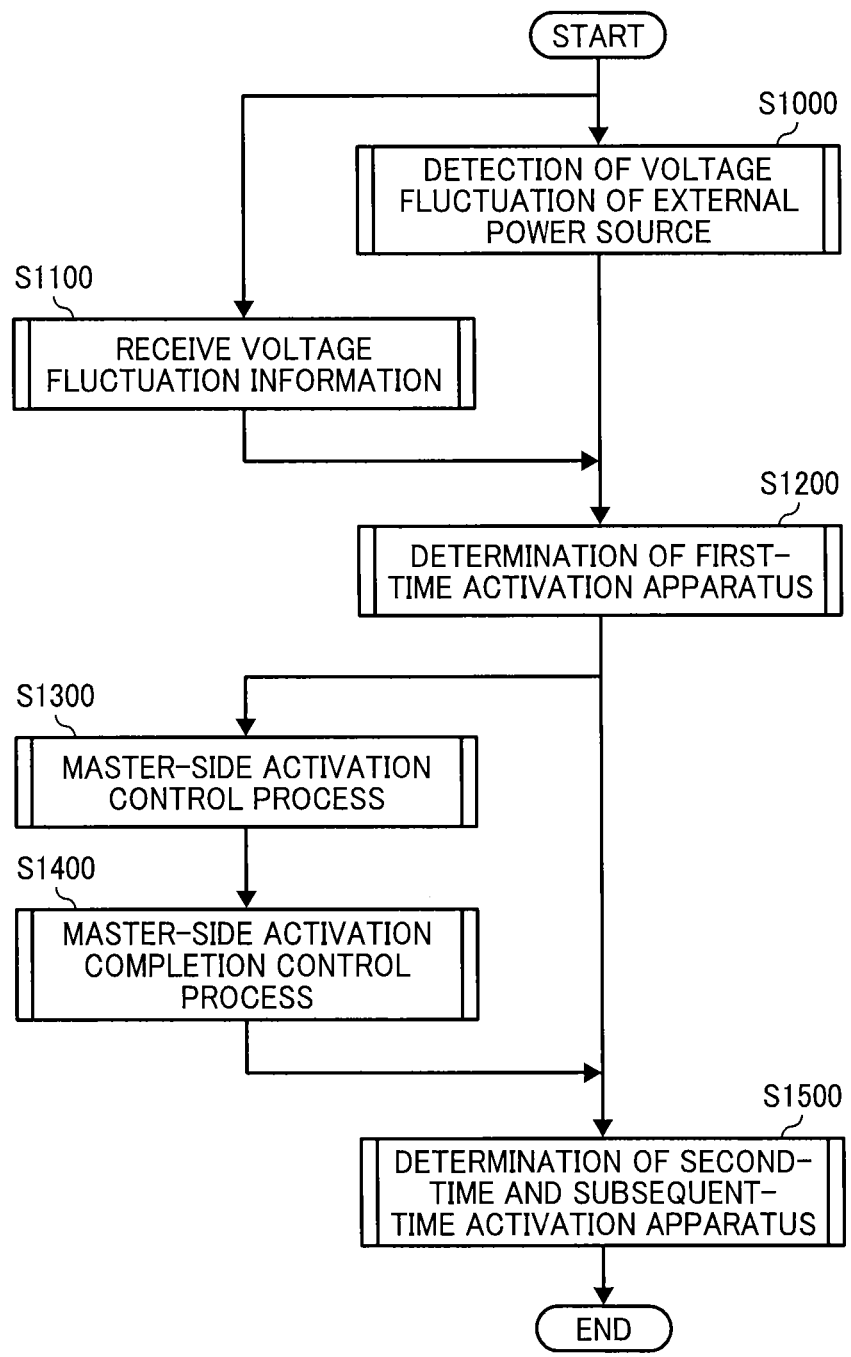
FIG. 9 is a flowchart of a process of activation control for a master apparatus.
Figure 10:
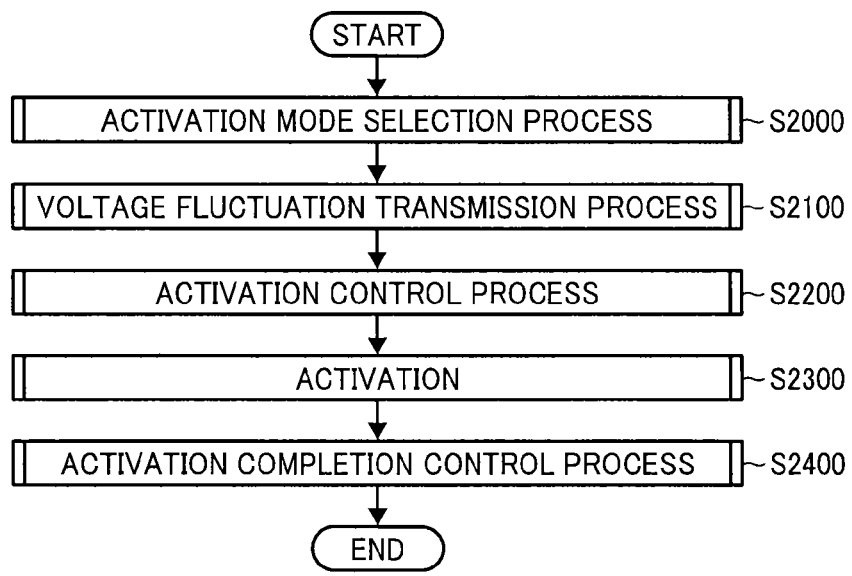
FIG. 10 is a flowchart of a process of activation control for a slave apparatus.

As for the activation control of slave apparatuses SK1 to SKn, the master apparatus MK conducts the activation control process shown in FIG. 9, wherein the slave apparatuses SK1 to SKn conducts the activation control process shown in FIG. 10.

A description is given of the activation control process for the master apparatus MK with reference to FIG. 9. As shown in FIG. 9, the master apparatus MK conducts the detection process of voltage fluctuation of external power source, in which detecting the voltage fluctuation of external power source (step S1000), and the master apparatus MK conducts a voltage fluctuation receiving process that receives activation modes of the slave apparatuses SK1 to SKn and the voltage fluctuation to the external power source caused by the activation modes of the slave apparatuses SK1 to SKn (step S1100). Then, the master apparatus MK conducts a first-time activation apparatus determination process to determine which slave apparatuses SK1 to SKn are allowed to be activated with the master apparatus MK at the same time (step S1200).

Upon conducting the first-time activation apparatus determination process, the master apparatus MK conducts a master-side activation control process that allows the activation of slave apparatuses SK1 to SKn determined to be activated (step S1300), and conducts a master-side activation completion control process that controls the activation completion of the activated slave apparatuses SK1 to SKn (step S1400).

Upon completing the first-time activation apparatus determination process, the master apparatus MK conducts the second and subsequent-time activation apparatus determination process to determine the slave apparatuses SK1 to SKn to be activated at the same time for the second and subsequent-time, in which second and subsequent activation apparatus determination process includes a process for the second-time activation, third-time activation, fourth-time activation and so on.

The master apparatus MK conducts the second and subsequent-time activation apparatus determination process (step S1500) to determine which slave apparatuses SK1 to SKn are allowed to be activated at the same time for the second and subsequent-time activation apparatus determination process, in which similar to the first-time activation apparatus determination process, the master-side activation control process (step S1300) and the master-side activation completion (control) process (step S1400) are repeatedly conducted (the same time apparatus activation control process) until completing the activation determination process for all of the slave apparatuses SK1 to SKn, and when the activation determination process for all of the slave apparatuses SK1 to SKn are completed, the activation control process ends.

A description is given of the activation control process for the slave apparatuses SK1 to SKn with reference to FIG. 10. As shown in FIG. 10, each of the slave apparatuses SK1 to SKn conducts an activation mode selection process to select an activation mode (step S2000), and the voltage fluctuation of external power source caused by the selected activation mode is obtained from the mode-based voltage fluctuation stored in the storage unit 40. Then, information of the voltage fluctuation is transmitted to the master apparatus MK, with which voltage fluctuation transmission process is conducted (step S2100).

Each of the slave apparatuses SK1 to SKn then conducts the activation control process (step S2200), and activates the apparatus using the selected activation mode and under the activation control process (step S2300).

Upon completing the activation, each of the slave apparatuses SK1 to SKn conducts the activation completion control process to complete the activation process (step S2400).

Figure 11:
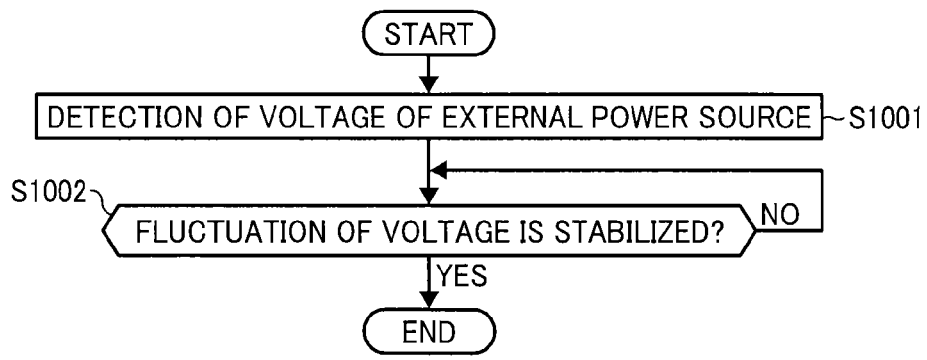
FIG. 11 is a flowchart of a detection process of voltage fluctuation of an external power source by a master apparatus.

Then, the master apparatus MK conducts the detection process of voltage fluctuation of the external power source at step S1000 (FIG. 9) as shown in FIG. 11.

The master apparatus MK starts the detection of voltage of the external power source using the voltage fluctuation detector 15 (step S1001). The voltage converting unit 31 configured in the engine controller 12 converts an input analog voltage signal of the external power source, detected by the voltage fluctuation detector 15, to a digital voltage signal that can be processed in the activation control unit 20, and checks whether the digital voltage signal is stabilized, which means the voltage converting unit 31 checks whether a voltage fluctuation of the external power source is stabilized within a given range (step S1002).

The master apparatus MK waits until the digital voltage signal, detected by the voltage fluctuation detector 15 and converted, is stabilized (step S1002). When the digital voltage signal value is stabilized, the digital voltage signal is obtained and stored in the storage unit 40 as the current power source voltage 45.

Figure 12:
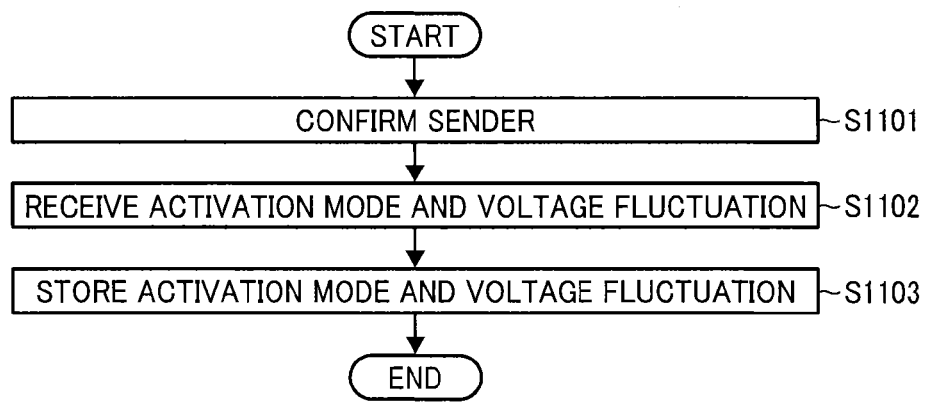
FIG. 12 is a flowchart of a process of receiving voltage fluctuation by a master apparatus.

Further, the master apparatus MK conducts the voltage fluctuation receiving process at step S1100 (FIG. 9) as shown in FIG. 12.

Upon receiving a request of receiving the voltage fluctuation from the slave apparatuses SK1 to SKn, the master apparatus MK confirms a sender slave apparatus (step S1101) at first, and receives an activation mode and voltage fluctuation (step S1102) from the sender slave apparatus.

Upon receiving the activation mode and voltage fluctuation, the master apparatus MK stores the received activation mode and voltage fluctuation in the mode-based voltage fluctuation 42 in the storage unit 40 by correlating the activation mode and voltage fluctuation with the slave apparatuses SK1 to SKn, and ends the process (step S1103).

Figure 13:
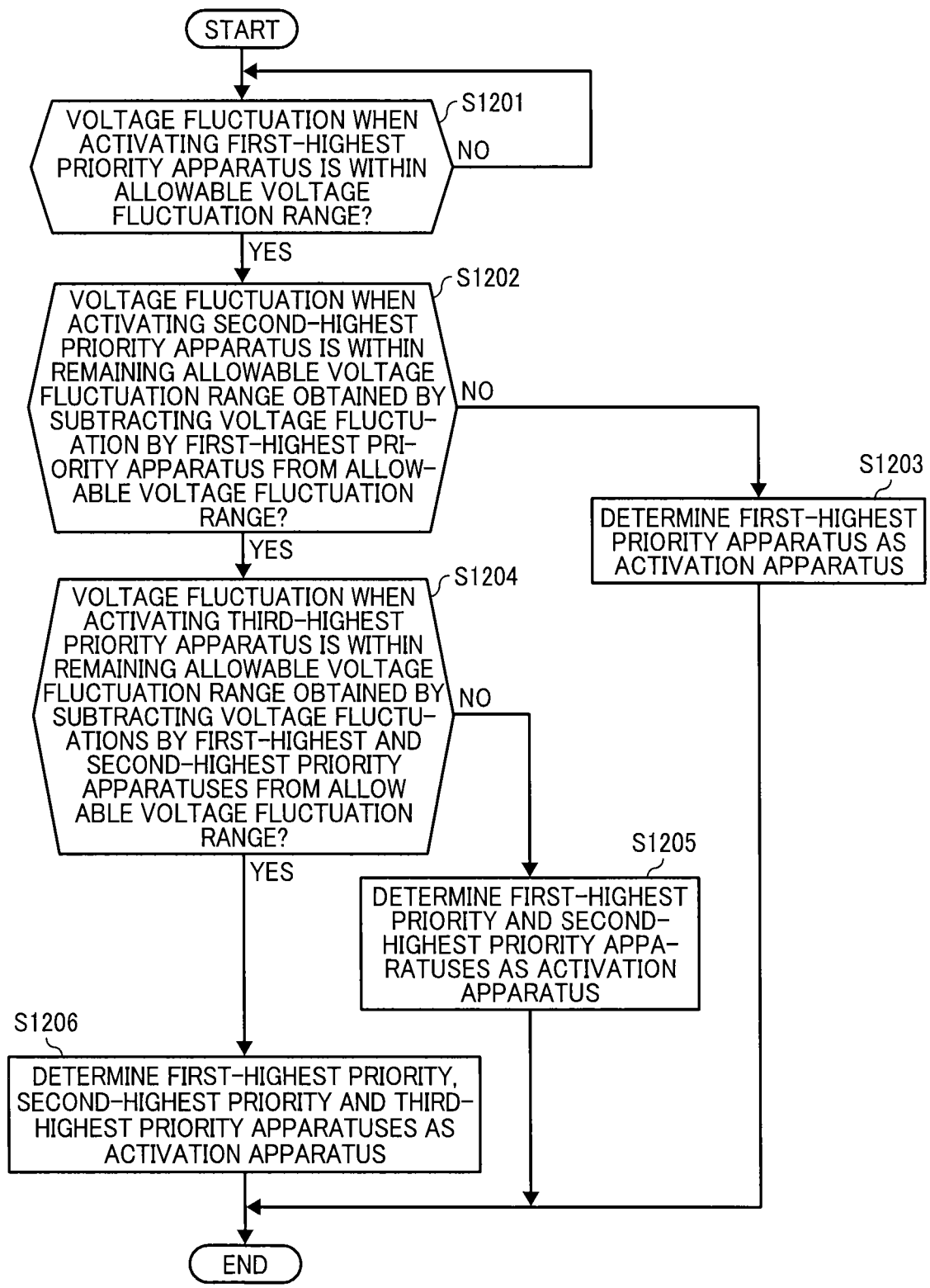
FIG. 13 is a flowchart of a process of first-time activation apparatus determination process by a master apparatus.

Further, the master apparatus MK conducts the first-time activation apparatus determination process at step S1200 (FIG. 9) as shown in FIG. 13.

Specifically, the master apparatus MK stores the activation priority order of the slave apparatuses SK1 to SKn in the priority order 41 of the storage unit 40 in advance. Upon shifting to the first-time activation apparatus determination process, the master apparatus MK reads out a voltage fluctuation, corresponding to the activation mode received at the voltage fluctuation receiving process for the first-highest priority order slave apparatus among the slave apparatuses SK1 to SKn stored in the priority order 41, from the voltage fluctuation information stored in the mode-based voltage fluctuation 42.

Then, it is checked whether the voltage fluctuation of external power source is within the allowable voltage fluctuation range 44 stored in the storage unit 40 (step S1201) when the first-highest priority order slave apparatus is activated using the activation mode of the first-highest priority order slave apparatus under the current power source voltage 45, obtained by the detection process of voltage fluctuation of external power source at step S101 of FIG. 4 (step S1000 of FIG. 9).

If the activation of the first-highest priority order slave apparatus among the slave apparatuses SK1 to SKn is conducted when the voltage fluctuation of external power source caused by the activation of the first-highest priority order slave apparatus is not within the allowable voltage fluctuation range 44 under the current power source voltage 45 (step S1201: NO), there is a concern that abnormality such as malfunction may occur, and therefore the master apparatus MK does not issue an activation-allowance. Then, under the detected current power source voltage 45, the master apparatus MK waits until the voltage fluctuation of external power source caused by activating the first-highest priority power-save activation mode becomes within the allowable voltage fluctuation range 44.

If the voltage fluctuation of external power source caused by activating the first-highest priority order slave apparatus is within the allowable voltage fluctuation range 44 (step S1201: YES) under the current power source voltage 45 obtained by the detection process of voltage fluctuation of external power source at step S101 of FIG. 4 (step S1000 of FIG. 9), the master apparatus MK determines that abnormality such as malfunction may not occur even if the activation of the first-highest priority order slave apparatus is conducted using the selected activation mode under the current power source voltage 45.

Then, the master apparatus MK reads out a voltage fluctuation corresponding to the second priority slave apparatus among the slave apparatuses SK1 to SKn from the voltage fluctuation of the slave apparatuses SK1 to SKn stored in the mode-based voltage fluctuation 42 by reading out the voltage fluctuation corresponding to the activation mode received at the voltage fluctuation receiving process.

Then, under the current power source voltage 45 obtained by the detection process of voltage fluctuation of external power source, it is checked whether the voltage fluctuation of external power source caused by activating the second priority slave apparatus using the activation mode received from the second priority slave apparatus is within a remaining allowable voltage fluctuation range (step S1202), in which the remaining allowable voltage fluctuation range is obtained by subtracting the voltage fluctuation caused by activating the first-highest priority order slave apparatus from the allowable voltage fluctuation range 44, which may be a pre-set allowable voltage fluctuation range for the external power source voltage.

If the voltage fluctuation of external power source caused by activating the second priority slave apparatus using the concerned activation mode is not within the remaining allowable voltage fluctuation range obtained by subtracting the voltage fluctuation caused by activating the first-highest priority order slave apparatus from the pre-set allowable voltage fluctuation range (step S1202: NO), the master apparatus MK selects and determines the first-highest priority order slave apparatus as an activation apparatus, and ends the first-time activation apparatus determination process (step S1203).

If the fluctuation of external power source voltage caused by activating the second priority slave apparatus using the concerned activation mode is within the remaining allowable voltage fluctuation range obtained by subtracting the voltage fluctuation caused by activating the first-highest priority order slave apparatus from the pre-set allowable voltage fluctuation range (step S1202: YES), the master apparatus MK determines that abnormality such as malfunction may not occur even if the activation of the second priority slave apparatus is conducted using the activation mode received from the second slave apparatus under the remaining allowable voltage fluctuation range.

Then, it is checked whether the voltage fluctuation of external power source caused by activating the third priority slave apparatus among the slave apparatuses SK1 to SKn is within a further remaining allowable voltage fluctuation range of the external power source voltage (step S1204), in which the further remaining allowable voltage fluctuation range is obtained by subtracting the voltage fluctuations of the first-highest and second-highest priority order slave apparatuses from the pre-set allowable voltage fluctuation range.

If the voltage fluctuation of external power source caused by activating the third priority slave apparatus is not within the further remaining allowable voltage fluctuation range (step S1204: NO), the master apparatus MK selects and determines the first-highest and the second-highest priority order slave apparatuses as activation apparatuses, and ends the first-time activation apparatus determination process (step S1205).

If the voltage fluctuation of external power source caused by activating the third priority slave apparatus is within the further remaining allowable voltage fluctuation range (step S1204: YES), the master apparatus MK selects and determines the first-highest, the second-highest and the third-highest priority order slave apparatuses as activation apparatuses, and ends the first-time activation apparatus determination process (step S1206).

In a case of FIG. 13, among the slave apparatuses SK1 to SKn, it is determined whether the first-highest to the third-highest priority order slave apparatuses can be activated at the same time for the first-time activation apparatus determination process, but the activation target apparatus is not limited to three apparatuses, which means it can determine which slave apparatuses SK1 to SKn can be activated at the same time under a given allowable voltage fluctuation range using the above described process.

Figure 14:
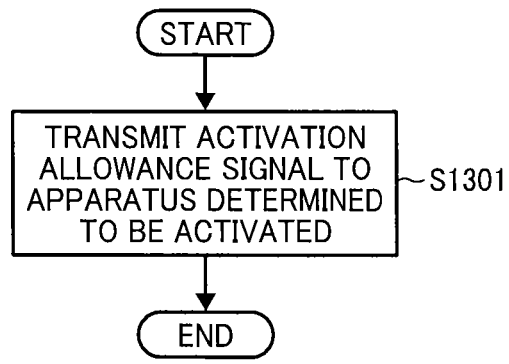
FIG. 14 is a flowchart of a process of master-side activation control process by a master apparatus.

Upon determining to-be-activated slave apparatuses SK1 to SKn as described above, as shown in FIG. 14, the master apparatus MK conducts a master-side activation control process at step S1300 (FIG. 9). Specifically, when the master apparatus MK is in the master-side activation control process, as shown in FIG. 14, the master apparatus MK transmits an activation allowance signal to the slave apparatuses SK1 to SKn, determined to-be-activated by the above described activation apparatuses determination process, and ends the master-side activation control process (step S1301).

Figure 15:
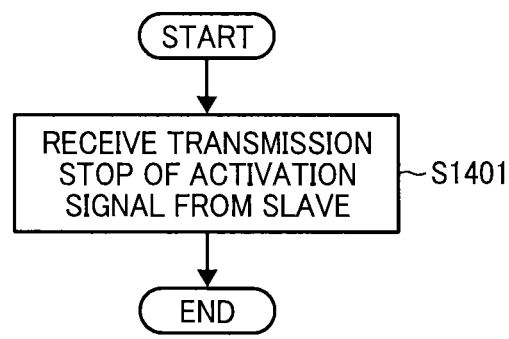
FIG. 15 is a flowchart of a process of master-side activation completion control process by a master apparatus.

The master apparatus MK transmits the activation allowance signal to the slave apparatus, determined to be activated, and then conducts a master-side activation completion control process at step S1400 (FIG. 9). Specifically, when the master apparatus MK is in the master-side activation completion control process, as shown in FIG. 15, the master apparatus MK receives the transmission stop of activation signal from the slave apparatus. To be described later, the slave apparatus is transmitted with the activation allowance signal in the master-side activation control process, and then starts the activation, and then the slave apparatus transmits the activation signal to the master apparatus MK. Upon receiving the transmission stop of activation signal, the master apparatus MK determines that the activation at the concerned slave apparatus has completed, and confirms the activation completion of the concerned slave apparatus (step S1401).

Figure 16:
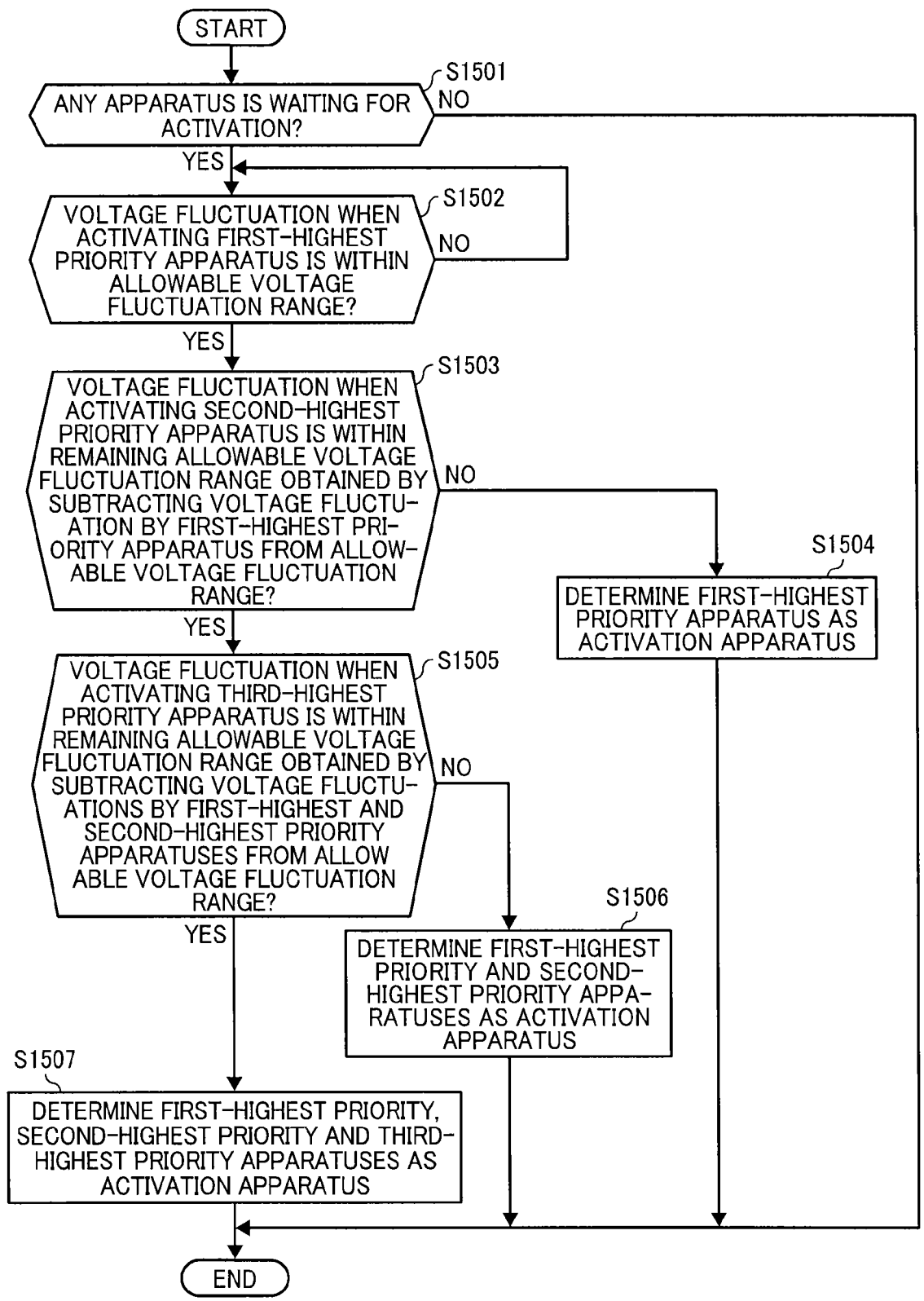
FIG. 16 is a flowchart of a process of second and subsequent-time activation apparatus determination process by a master apparatus.

Then, as shown in FIG. 16, the master apparatus MK conducts a second and subsequent-time activation apparatus determination process to the slave apparatuses SK1 to SKn, which may not be determined to be activated at the first-time activation apparatus determination process.

Specifically, when the master apparatus MK is in the second and subsequent-time activation apparatus determination process of S1500 of FIG. 9, as shown in FIG. 16, the master apparatus MK checks whether one or more of the slave apparatuses SK1 to SKn are waiting for activation (step S1501). If a slave apparatus waiting for activation does not exist (step S1501: NO), the master apparatus MK determines that the activation of all of the slave apparatuses SK1 to SKn is completed, and ends the second and subsequent-time activation apparatus determination process.

If the slave apparatuses SK1 to SKn waiting for activation exists (step S1501: YES), a first-highest priority order slave apparatus exists among the slave apparatuses SK1 to SKn, which may not be activated at the first-time activation apparatus determination process. The master apparatus MK checks whether the voltage fluctuation of external power source caused by activating the first-highest priority order slave apparatus using the above mentioned activation mode under the current power source voltage 45, obtained by the detection process of voltage fluctuation of external power source (step S1000 of FIG. 9), is within the allowable voltage fluctuation range 44 stored in the storage unit 40 (step S1502).

If the voltage fluctuation of external power source caused by the activating the first-highest priority order slave apparatus for the second and subsequent-time under the current power source voltage 45 is not within the allowable voltage fluctuation range 44 (step S1502: NO), there is a concern that abnormality such as malfunction may occur when the first-highest priority slave apparatus is activated under the current power source voltage 45, and therefore the master apparatus MK does not issue an activation-allowance. Then, under the detected current power source voltage 45, the master apparatus MK waits until the voltage fluctuation of external power source caused by activating the first-highest priority order slave apparatus becomes within the allowable voltage fluctuation range 44.

If the voltage fluctuation of external power source caused by activating the first-highest priority order slave apparatus using the above mentioned activation mode is within the allowable voltage fluctuation range 44 for the second and subsequent-time under the current power source voltage 45 (step S1502: YES), the master apparatus MK determines that abnormality such as malfunction may not occur even if the activation of the first-highest priority order slave apparatus is conducted using the selected activation mode under the current power source voltage 45 for the second and subsequent-time.

Then, similar to the first-time activation apparatus determination process, the master apparatus MK reads out a voltage fluctuation corresponding to the second priority slave apparatus among the slave apparatuses SK1 to SKn for the second and subsequent-time from the voltage fluctuation of the slave apparatuses SK1 to SKn stored in the mode-based voltage fluctuation 42 by reading out the voltage fluctuation corresponding to the activation mode received at the voltage fluctuation receiving process.

Then, under the current power source voltage 45 obtained by the detection process of voltage fluctuation of external power source, it is checked whether the voltage fluctuation of external power source caused by activating the second priority slave apparatus using the activation mode received from the second priority slave apparatus is within a remaining allowable voltage fluctuation range (step S1503), in which the remaining allowable voltage fluctuation range is obtained by subtracting the voltage fluctuation caused by activating the first-highest priority order slave apparatus from the allowable voltage fluctuation range 44, which may be a pre-set allowable voltage fluctuation range for the external power source voltage.

If the voltage fluctuation of external power source caused by activating the second priority slave apparatus using the concerned activation mode is not within the remaining allowable voltage fluctuation range obtained by subtracting the voltage fluctuation caused by activating the first-highest priority order slave apparatus from the pre-set allowable voltage fluctuation range for the second and subsequent-time (step S1503: NO), the master apparatus MK selects and determines the first-highest priority order slave apparatus as an activation apparatus for the second and subsequent-time, and ends the second and subsequent-time activation apparatus determination process (step S1504).

If the fluctuation of external power source voltage caused by activating the second priority slave apparatus using the concerned activation mode is within the remaining allowable voltage fluctuation range obtained by subtracting the voltage fluctuation caused by activating the first-highest priority order slave apparatus from the pre-set allowable voltage fluctuation range for the second and subsequent-time (step S1503: YES), the master apparatus MK determines that abnormality such as malfunction may not occur even if the activation of the second priority slave apparatus is conducted using the activation mode received from the second slave apparatus under the remaining allowable voltage fluctuation range for the second and subsequent-time.

Then, it is checked whether the voltage fluctuation of external power source caused by activating the third priority slave apparatus among the slave apparatuses SK1 to SKn is within a further remaining allowable voltage fluctuation range of the external power source voltage for the second and subsequent-time (step S1505), in which the further remaining allowable voltage fluctuation range is obtained by subtracting the voltage fluctuations of the first-highest and second-highest priority order slave apparatuses from the pre-set allowable voltage fluctuation range.

If the voltage fluctuation of external power source caused by activating the third priority slave apparatus is not within the further remaining allowable voltage fluctuation range for the second and subsequent-time (step S1505: NO), the master apparatus MK selects and determines the first-highest and the second-highest priority order slave apparatuses as activation apparatuses for the second and subsequent-time, and ends the second and subsequent-time activation apparatus determination process (step S1506).

If the voltage fluctuation of external power source caused by activating the third priority slave apparatus is within the further remaining allowable voltage fluctuation range for the second and subsequent-time (step S1505: YES), the master apparatus MK selects and determines the first-highest, the second-highest and the third-highest priority order slave apparatuses as activation apparatuses for the second and subsequent-time, and ends the second and subsequent-time activation apparatus determination process (step S1507).

In a case of FIG. 16, among the slave apparatuses SK1 to SKn, it is determined whether the first-highest priority order to the third-highest priority order slave apparatuses can be activated for the second and subsequent-time activation apparatus determination process, but the activation target apparatus is not limited to three apparatuses, which means it can determine which slave apparatuses SK1 to SKn can be activated at the same time under a given allowable voltage fluctuation using the above described process.

Each of the slave apparatuses SK1 to SKn can conduct the activation mode selection process, the voltage fluctuation transmission process, the activation control process, and the activation completion control process of FIG. 10 as shown in FIGS. 17 to 20.

Figure 17:
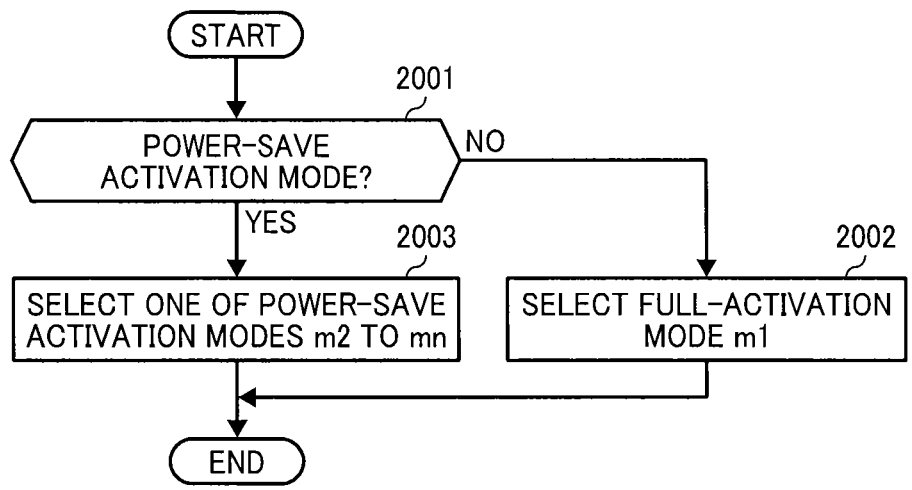
FIG. 17 is a flowchart of a process of activation mode selection process by a slave apparatus.

First, each of the slave apparatuses SK1 to SKn conducts the activation mode selection process as shown in FIG. 17. Hereinafter, the slave apparatuses SK1 to SKn may be simply referred to as the slave apparatus. Specifically, when the slave apparatus is in the activation mode selection process, it is checked whether the activation mode requested or set for the slave apparatus is one of the power-save activation modes m2 to mn (step S2001). If the activation mode is not the power-save activation modes m2 to mn (step S2001: NO), the slave apparatus selects the full-activation mode m1 as an activation mode (step S2002), and the slave apparatus ends the activation mode selection process.

If the requested or set activation mode of the slave apparatus is one of the power-save activation modes m2 to mn (step S2001: YES), the slave apparatus selects one of the power-save activation modes m2 to mn as an activation mode depending on the requested or set activation mode of the slave apparatus (step S2003), and the slave apparatus ends the activation mode selection process.

Figure 18:
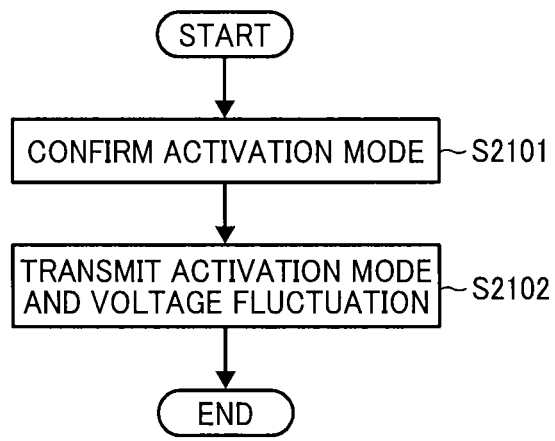
FIG. 18 is a flowchart of a process of voltage fluctuation transmission process by a slave apparatus.

Then, the slave apparatus conducts the voltage fluctuation transmission process as shown in FIG. 18. Specifically, when the slave apparatus is in the voltage fluctuation transmission process, the slave apparatus confirms the activation mode selected at the activation mode selection process (step S2101), and obtains a voltage fluctuation stored for the concerned activation mode in advance, and transmits the concerned activation mode and the corresponding voltage fluctuation to the master apparatus MK (step S2102), wherein the transmitted voltage fluctuation corresponds to the voltage fluctuation of external power source when the slave apparatus is activated. The voltage fluctuation can be obtained for each of the slave apparatuses SK1 to SKn by measuring the voltage fluctuation amplitude of external power source when each activation mode is actually activated, and the obtained voltage fluctuation amplitude can be stored in a memory of each of the slave apparatuses SK1 to SKn by correlating the voltage fluctuation amplitude with the activation mode.

Figure 19:
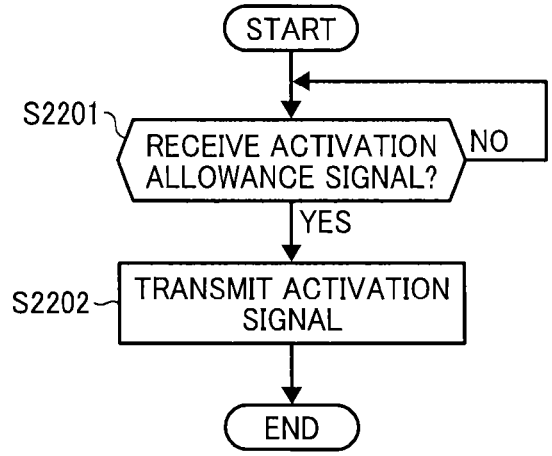
FIG. 19 is a flowchart of a process of activation control process by a slave apparatus.

Then, each of the slave apparatus conducts the activation control process as shown in FIG. 19. Specifically, when the slave apparatus is in the activation control process, as shown in FIG. 19, the slave apparatus checks whether the activation allowance signal is received from the master apparatus MK (step S2201). If the activation allowance signal is not received (step S2201: NO), the slave apparatus checks whether the activation allowance signal is received with a given time interval.

Upon receiving the activation allowance signal at step S2201, the slave apparatus starts the activation under the above mentioned activation mode using the external power source, and transmits an activation signal indicating that the activation is started and being in activation to the master apparatus MK, and ends the activation control process (step S2202).

Figure 20:
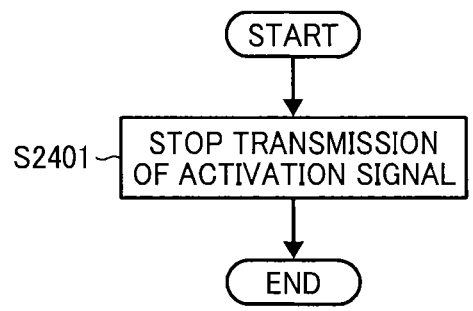
FIG. 20 is a flowchart of a process of activation completion control process by a slave apparatus.

Then, the slave apparatus conducts the activation completion control process as shown in FIG. 20. Specifically, when the slave apparatus is in the activation completion control process after completing the activation, as shown in FIG. 20, the slave apparatus stops the transmission of activation signal to the master apparatus MK to report the completion of activation of the slave apparatus to the master apparatus MK, and then ends the activation completion control process (step S2401).

As described above, the master apparatus MK can confirm that the slave apparatuses SK1 to SKn have started the activation by receiving the activation signal from the slave apparatuses SK1 to SKn, and the master apparatus MK can confirm that the activation of the slave apparatuses SK1 to SKn have completed by receiving the transmission stop of the activation signal.

Figure 21:
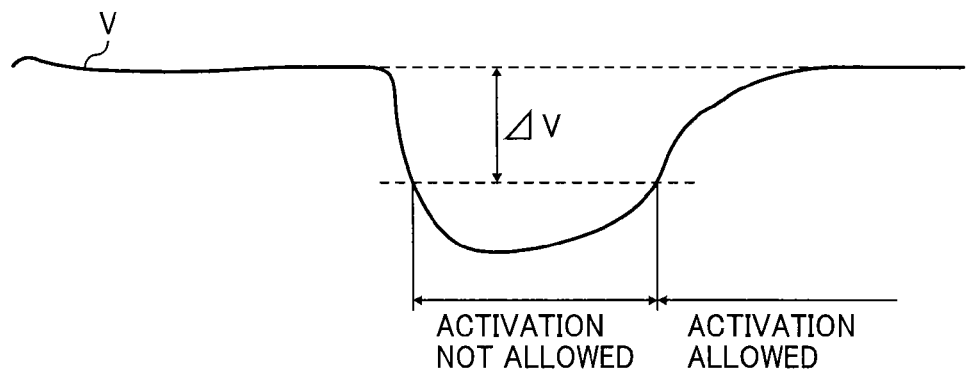
FIG. 21 shows a relationship between a voltage of an external power source and allowable voltage fluctuation.

In the above description, the allowable voltage fluctuation range 44 is assumed to set with a fixed value. As shown in FIG. 21, if the voltage fluctuation amplitude of the external power source voltage indicated by V, exceeds the allowable voltage fluctuation range 44 (see ΔV) when the activation is conducted under the current power source voltage 45, the master apparatus MK does not allow the activation, and if the voltage fluctuation amplitude of the external power source is within the ΔV (allowable voltage fluctuation range 44), the master apparatus MK allows the activation.

The allowable voltage fluctuation range 44 is set as an allowable voltage fluctuation range that does not cause abnormality such as malfunction to the operations of all of the apparatuses using the external power source in view of the current power source voltage 45 when activating the master apparatus MK and the slave apparatuses SK1 to SKn, wherein the current power source voltage 45 can be set based on voltage condition depending on activation condition and operation condition of the master apparatus MK, the slave apparatuses SK1 to SKn and the activation non-management apparatus HK, and voltage condition depending on power source equipment condition of external power source. Because the allowable voltage fluctuation range 44 depends on environment where the activation management network system 1 exists and operation condition, the allowable voltage fluctuation range 44 can be updated to a suitable level using measured voltage fluctuation at each environment.

Figure 22:
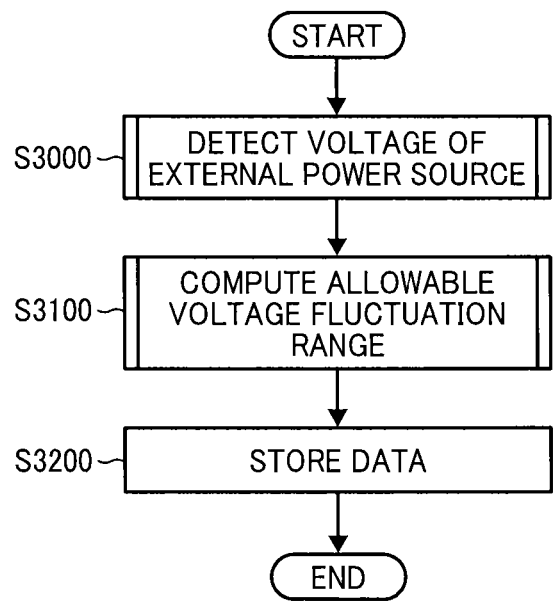
FIG. 22 is a flowchart of a process of updating allowable voltage fluctuation.

Specifically, as shown in FIG. 22, the master apparatus MK conducts an updating process of allowable voltage fluctuation range at a given timing. When the master apparatus MK is in the updating process of allowable voltage fluctuation range, the master apparatus MK detects the voltage of external power source using the voltage fluctuation detector 15 in the detection process of voltage fluctuation of external power source (step S3000). Based on the detected voltage of external power source, the master apparatus MK conducts the computing process of allowable voltage fluctuation range (step S3100). Upon computing the allowable voltage fluctuation range, the master apparatus MK updates and stores the allowable voltage fluctuation range 44 in the storage unit 40 using the computed allowable voltage fluctuation range, and ends the updating process of allowable voltage fluctuation range (step S3200).

Figure 23:
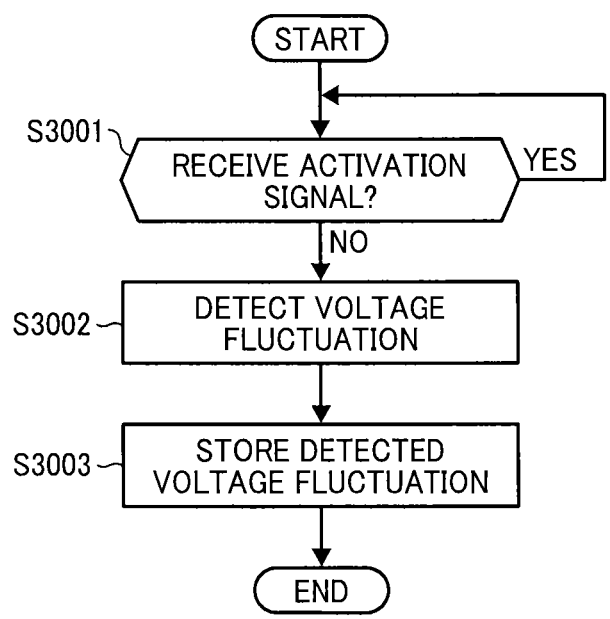
FIG. 23 is a flowchart of a detection process of voltage fluctuation of an external power source.

The master apparatus MK conducts the detection process of voltage fluctuation of external power source at step S3000 as shown in FIG. 23. Specifically, as shown in FIG. 23, the master apparatus MK checks whether the master apparatus MK receives an activation signal from any one of the slave apparatuses SK1 to SKn (step S3001). Specifically, the master apparatus MK conducts the updating process of allowable voltage fluctuation range at a timing when the slave apparatuses SK1 to SKn do not conduct the activation process, in which the master apparatus MK detects a timing not receiving the activation signal from all of the slave apparatuses SK1 to SKn at step S3001 as a suitable timing for the updating process of allowable voltage fluctuation range.

When the master apparatus MK does not receive the activation signal from any one of the slave apparatuses SK1 to SKn (step S3001: NO), the master apparatus MK detects the voltage of external power source using the voltage fluctuation detector 15. The voltage converting unit 31 converts analog voltage signal of the external power source detected by the voltage fluctuation detector 15 to digital voltage signal that can be processed in the activation control unit 20, and the master apparatus MK detects the voltage fluctuation amplitude of the external power source based on the digital voltage signal (step S3002), and stores the detected voltage fluctuation amplitude in the storage unit 40 (step S3003).

Figure 24:
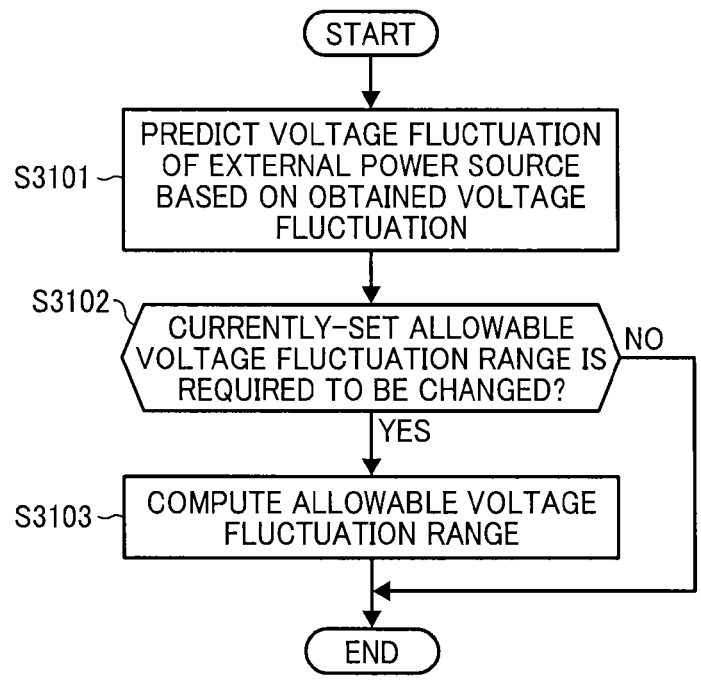
FIG. 24 is a flowchart of a process of computing allowable voltage fluctuation.

Then, based on the voltage fluctuation amplitude detected at the detection process of voltage fluctuation of external power source, the master apparatus MK conducts the computing process of allowable voltage fluctuation range as shown in FIG. 24. Specifically, as shown in FIG. 24, when the master apparatus MK is in the computing process of allowable voltage fluctuation range, the master apparatus MK predicts the voltage fluctuation of external power source based on the voltage fluctuation amplitude obtained by the detection process of voltage fluctuation of external power source (step S3101).

Then, the master apparatus MK determines whether currently-set allowable voltage fluctuation range is required to be changed based on a prediction result of the voltage fluctuation of external power source (step S3102).

If the currently-set allowable voltage fluctuation range is required to be changed (step S3102: YES), the master apparatus MK computes a new allowable voltage fluctuation range based on the voltage fluctuation amplitude of external power source (step S3103), and updates the allowable voltage fluctuation range 44 in the storage unit 40 using the new allowable voltage fluctuation range at step S3200 (FIG. 22)

If the currently-set allowable voltage fluctuation range is not required to be changed (step S3102: NO), without computing a new allowable voltage fluctuation range, the master apparatus MK ends the computing process of allowable voltage fluctuation range.

Further, in the above description, the activation mode of each of the slave apparatuses SK1 to SKn and the voltage fluctuation amplitude of external power source corresponding to the activation mode of each of the slave apparatuses SK1 to SKn are transmitted from the slave apparatuses SK1 to SKn to the master apparatus MK to update the voltage fluctuation amplitude of external power source.

Figure 25:
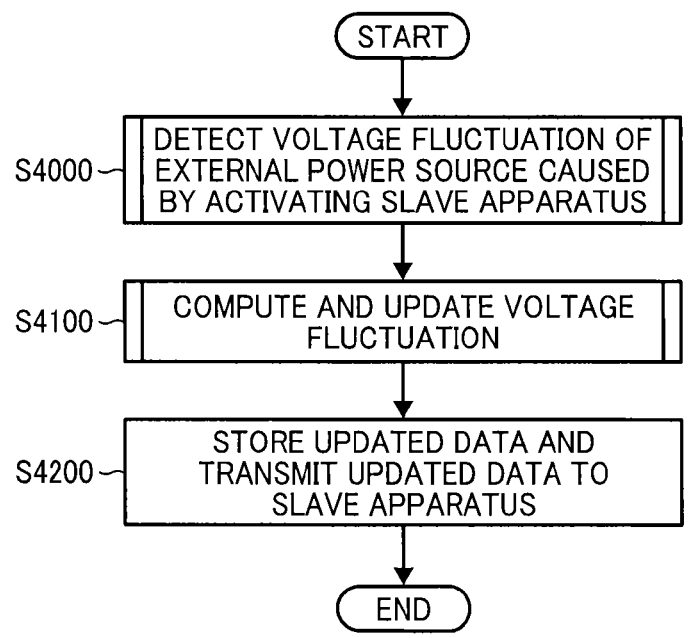
FIG. 25 is a flowchart of a process of detection and updating voltage fluctuation caused by activating a slave apparatus.
Figure 26:
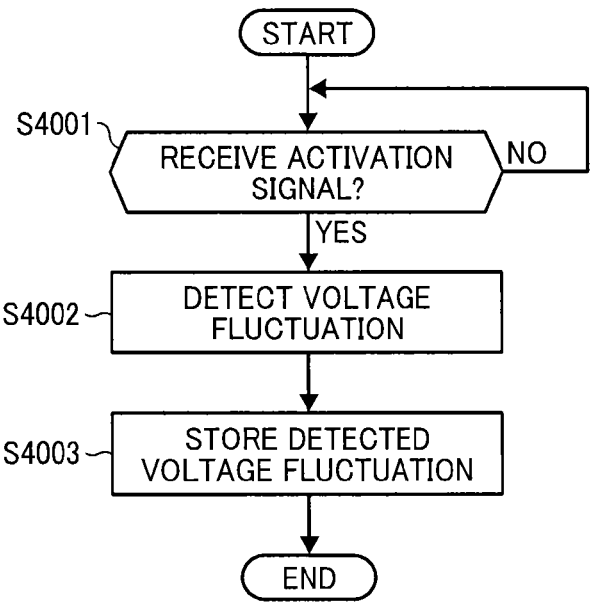
FIG. 26 is a flowchart of a detection process of voltage fluctuation caused by activating a slave apparatus.
Figure 27:
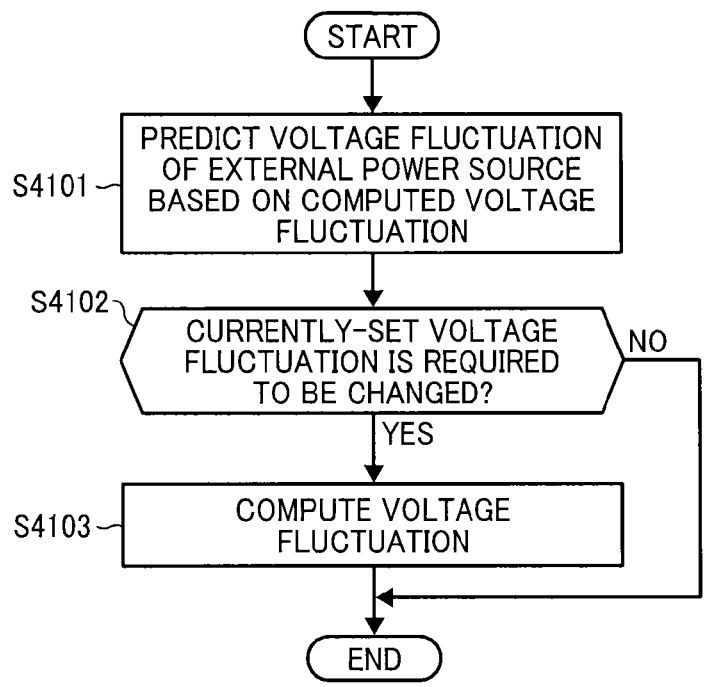
FIG. 27 is a flowchart of a process of computing voltage fluctuation.

Further, the voltage fluctuation amplitude of external power source can be updated as shown in FIGS. 25 to 27, in which the master apparatus MK detects the activation mode and the voltage fluctuation amplitude of each of the slave apparatuses SK1 to SKn to update the voltage fluctuation amplitude of external power source, as required.

Specifically, as shown in FIG. 25, the master apparatus MK conducts a detection process of voltage fluctuation caused by activating the slave apparatus at a given timing (step S4000), in which detecting the voltage fluctuation of external power source caused by activating the slave apparatuses SK1 to SKn (step S4000). Based on the voltage fluctuation amplitude of external power source, detected by the detection process of voltage fluctuation caused by activating the slave apparatus, the master apparatus MK conducts the updating process of voltage fluctuation amplitude (step S4100), and stores the updated data in the storage unit 40 as the mode-based voltage fluctuation 42, and transmits the updated data to the corresponding slave apparatuses SK1 to SKn (step S4200).

The mode-based voltage fluctuation corresponds to the voltage fluctuation amplitude of external power source caused by activating a slave apparatus using an activation mode. The mode-based voltage fluctuation can be set based on the current power source voltage 45 when activating the slave apparatuses SK1 to SKn, which may depend on voltage condition depending on activation condition and operation condition of the master apparatus MK, the slave apparatuses SK1 to SKn and the activation non-management apparatus HK, and voltage condition depending on power source equipment condition of external power source. Because the mode-based voltage fluctuation depends on environment where the activation management network system 1 exists and operation condition, the mode-based voltage fluctuation can be updated to a suitable level by updating the mode-based voltage fluctuation 42 using measured voltage fluctuation at each environment as shown in FIGS. 25 to 27.

Specifically, the master apparatus MK conducts detection and updating process of voltage fluctuation caused by the slave apparatus activation at a given timing as shown in FIG. 25. When the master apparatus MK is in the detection and updating process of voltage fluctuation caused by the slave apparatus activation, the master apparatus MK conducts the detection process of voltage fluctuation caused by the slave apparatus activation that detects the voltage fluctuation amplitude of external power source when activating the slave apparatus using the voltage fluctuation detector 15 (step S4000).

Based on the detected voltage fluctuation amplitude of external power source, the master apparatus MK conducts a computing process of voltage fluctuation that computes the voltage fluctuation caused by activating the slave apparatuses SK1 to SKn using the activation mode (step S4100).

Upon conducting the computing process of voltage fluctuation, the master apparatus MK stores the computed voltage fluctuation and the activation mode in the mode-based voltage fluctuation 42 of the storage unit 40 for the updating process, and transmits data of the computed voltage fluctuation to the corresponding slave apparatuses SK1 to SKn to update the voltage fluctuation of the slave apparatuses SK1 to SKn, and ends the detection and updating process of voltage fluctuation caused by activating the slave apparatus activation (step S4200).

Then, the master apparatus MK conducts the detection process of voltage fluctuation caused by activating the slave apparatus at step S4000 as shown in FIG. 26. Specifically, as shown in FIG. 26, the master apparatus MK checks whether the master apparatus MK receives an activation signal from any one of the slave apparatuses SK1 to SKn (step S4001). Specifically, the master apparatus MK conducts the detection and updating process of voltage fluctuation caused by activating the slave apparatus activation at a timing when the slave apparatuses SK1 to SKn is conducting the activation process, and detects a timing receiving the activation signal from any one of the slave apparatuses SK1 to SKn at step S4001 as a suitable timing for the detection and updating process of voltage fluctuation of the slave apparatus.

If the master apparatus MK receives the activation signal from any one of the slave apparatuses SK1 to SKn (step S4001: YES), the voltage fluctuation detector 15 detects the voltage of external power source, and the voltage converting unit 31 converts analog voltage signal of the external power source detected by the voltage fluctuation detector 15 to digital voltage signal that can be processed in the activation control unit 20. The master apparatus MK detects the voltage fluctuation amplitude of the external power source when activating the slave apparatuses SK1 to SKn based on the digital voltage signal (step S4002), and stores the detected voltage fluctuation amplitude in the storage unit 40 (step S4003).

Then, the master apparatus MK conducts the computing process of voltage fluctuation that computes voltage fluctuation when activating the concerned slave apparatuses SK1 to SKn using the concerned activation mode based on the voltage fluctuation amplitude detected by the detection process of voltage fluctuation caused by activating the slave apparatus as shown in FIG. 27. Specifically, as shown in FIG. 27, when the master apparatus MK is in the computing process of voltage fluctuation, the master apparatus MK predicts the voltage fluctuation when activating the concerned slave apparatuses SK1 to SKn using the concerned activation mode based on the voltage fluctuation amplitude of the power source obtained by the detection process of voltage fluctuation caused by activating the slave apparatus (step S4101). The master apparatus MK determines whether a currently-set voltage fluctuation is required to be changed based on a prediction result of voltage fluctuation (step S4102).

If the currently-set voltage fluctuation is required to be changed (step S4102: YES), the master apparatus MK computes a new voltage fluctuation based on the detected voltage fluctuation amplitude (step S4103), and updates the mode-based voltage fluctuation 42 stored in the storage unit 40 for the concerned activation mode of the concerned slave apparatuses SK1 to SKn with the new voltage fluctuation.

If the currently-set voltage fluctuation is not required to be changed (step S4102: NO), without computing a new voltage fluctuation, the master apparatus MK ends the detection process of voltage fluctuation caused by activating the slave apparatus.

In the above described activation management network system 1, the activation control unit 20 of the master apparatus MK includes, for example, the priority order signal communication unit 35 useable as the voltage fluctuation obtainer, the voltage converting unit 31 useable as the voltage fluctuation detector, and the priority order control unit 32 useable as activation controller. The priority order signal communication unit 35 (or voltage fluctuation obtainer) obtains the voltage fluctuation amplitude of the external power source to be caused by activating the master apparatus MK and the slave apparatuses SK1 to SKn using the external power source. The voltage converting unit 31 (or voltage fluctuation detector) detects the voltage fluctuation of the external power source. The priority order control unit 32 (or activation controller) determines whether the voltage fluctuation amplitude of the external power source detected by the voltage fluctuation detector 31 is within the allowable voltage fluctuation range 44 set in advance, and controls the activation using the external power source based on the determination result.

Therefore, under the condition that the voltage fluctuation caused by activating the master apparatus MK and the slave apparatuses SK1 to SKn using the current power source voltage is within the allowable voltage fluctuation range 44, the master apparatus MK, the slave apparatuses SK1 to SKn used as an image processing apparatus such as a multifunction peripherals (MFP) can be activated, and the master apparatus MK and the slave apparatuses SK1 to SKn (activation management target) can be activated promptly within the allowable voltage fluctuation range 44.

Further, as for the activation management network system 1, the master apparatus MK may be an image processing apparatus such as a multifunction peripherals (MFP) that conducts image processing, and includes, for example, the activation control unit 20.

Therefore, under the condition that the voltage fluctuation caused by activating the master apparatus MK and the slave apparatuses SK1 to SKn using the current power source voltage is within the allowable voltage fluctuation range 44, the master apparatus MK and the slave apparatuses SK1 to SKn can be activated, and the master apparatus MK and the slave apparatuses SK1 to SKn (activation management target) can be activated promptly within the allowable voltage fluctuation range 44.

Further, as for the activation management network system 1, the activation control unit 20 of the master apparatus MK can conduct the following steps when activating one or more apparatuses using the external power source. Specifically, the activation control unit 20 conducts the activation control method including the steps of obtaining voltage fluctuation amplitude of an external power source at a given voltage, the voltage fluctuation caused when activating the apparatus using the external power source; detecting the voltage fluctuation of the external power source at the given voltage; determining whether the voltage fluctuation amplitude obtained in the obtaining step at the given voltage of the external power source, detected in the detecting step, is within the allowable voltage fluctuation range 44, which is a preset allowable voltage fluctuation range; and controlling activation of the apparatus using the external power source based on the voltage fluctuation determined in the determining step.

Therefore, under the condition that the voltage fluctuation caused by activating the master apparatus MK and the slave apparatuses SK1 to SKn using the current power source voltage is within the allowable voltage fluctuation range 44, the master apparatus MK and the slave apparatuses SK1 to SKn can be activated, and the master apparatus MK and the slave apparatuses SK1 to SKn (activation management target) can be activated promptly within the allowable voltage fluctuation range 44.

Further, as for the activation management network system 1, the activation control unit 20 of the master apparatus MK is a processor such as CPU installed with the activation control program that can conduct the following steps when activating one or more apparatuses using the external power source. The activation control method including the steps of obtaining voltage fluctuation amplitude of an external power source at a given voltage, the voltage fluctuation caused when activating the apparatus using the external power source; detecting the voltage fluctuation of the external power source at the given voltage; determining whether the voltage fluctuation amplitude obtained in the obtaining step at the given voltage of the external power source, detected in the detecting step, is within the allowable voltage fluctuation range 44, which is a preset allowable voltage fluctuation range; and controlling activation of the apparatus using the external power source based on the voltage fluctuation determined in the determining step.

Therefore, under the condition that the voltage fluctuation caused by activating the master apparatus MK and the slave apparatuses SK1 to SKn using the current power source voltage is within the allowable voltage fluctuation range 44, the master apparatus MK and the slave apparatuses SK1 to SKn can be activated, and the master apparatus MK and the slave apparatuses SK1 to SKn (activation management target) can be activated promptly within the allowable voltage fluctuation range 44.

Further, as for the activation management network system 1, the voltage converting unit 31, which can be used as the voltage fluctuation obtainer, of the master apparatus MK obtains the voltage fluctuation of a plurality of activation modes set for the master apparatus MK and the slave apparatuses SK1 to SKn. The priority order control unit 32, which can be used as the activation controller, detects which activation mode among the plurality of the activation modes is used, determines whether the voltage fluctuation caused by the detected activation mode under the current power source voltage is within the allowable voltage fluctuation range 44, and controls the activation using the external power source based on the determination result.

Therefore, the master apparatus MK, the slave apparatuses SK1 to SKn can be activated under the current power source voltage within the allowable voltage fluctuation range 44 in view of the activation modes of the master apparatus MK, the slave apparatuses SK1 to SKn, and the master apparatus MK and the slave apparatuses SK1 to SKn (activation management target) can be activated promptly within the allowable voltage fluctuation range 44.

Further, as for the activation management network system 1, the voltage converting unit 31, which can be used as the voltage fluctuation obtainer, of the master apparatus MK can obtain the voltage fluctuation caused by the activation modes including the full-activation mode m1 (all unit activation mode) and a plurality of the power-save activation modes m2 to mn. In a case of the full-activation mode m1, the master apparatus MK and the slave apparatuses SK1 to SKn supplies power to all units that require power supply. In a case of using the power-save activation modes m2 to mn, the number of units to be supplied with power increases incrementally with a given priority order set for the power-save activation modes m2 to mn.

When the activation is conducted using the power-save activation modes m2 to mn, the priority order control unit 32, which can be used as the activation controller, can activate one or more of the power-save activation modes m2 to mn with a condition that the voltage fluctuation caused by one or more of the power-save activation modes m2 to mn is within the allowable voltage fluctuation range 44 and controlling the power supply of the to-be-activated activation modes at the largest power supply amount.

Therefore, the master apparatus MK and the slave apparatuses SK1 to SKn having a plurality of activation modes can be activated with a greater number of units in view of the activation modes within the allowable voltage fluctuation range 44, and the master apparatus MK and the slave apparatuses SK1 to SKn (activation management target apparatuses) can be activated promptly within the allowable voltage fluctuation range 44.

Further, as for the activation management network system 1, the activation control unit 20 of the master apparatus MK further includes the power control unit 30, useable as an apparatus detection unit, and the voltage converting unit 31, useable as an apparatus voltage fluctuation obtainer. The power control unit 30 (or apparatus detection unit) detects the master apparatus MK and other apparatuses such as the slave apparatuses SK1 to SKn and the activation non-management apparatus HK connected to the same external power source used for the master apparatus MK. The voltage converting unit 31 (or apparatus voltage fluctuation obtainer apparatus) obtains the voltage fluctuation amplitude to the external power source caused by slave apparatuses (activation management target apparatuses) among the detected slave apparatuses SK1 to SKn and the activation non-management apparatus HK. The priority order control unit 32, used as the activation controller, controls the activation of each of the slave apparatuses SK1 to SKn based on the voltage fluctuation amplitude of the external power source caused by each of the slave apparatuses SK1 to SKn detected by the voltage converting unit 31 and the allowable voltage fluctuation range 44.

Therefore, when the activation of the slave apparatuses SK1 to SKn using the same external power source with the master apparatus MK is conducted, the slave apparatuses SK1 to SKn can be activated under the condition that the voltage fluctuation caused by activating the master apparatus MK and the slave apparatuses SK1 to SKn under the current power source voltage is within the allowable voltage fluctuation range 44, and the slave apparatuses SK1 to SKn can be activated promptly within the allowable voltage fluctuation range 44.

Further, as for the activation management network system 1, the priority order control unit 32, which can be used as the activation controller, can conduct an activation control process by controlling the number of the slave apparatuses SK1 to SKn to be activated in view of the allowable voltage fluctuation range 44. Specifically, the slave apparatuses SK1 to SKn are set with a given priority order. Based on the priority order, the priority order control unit 32 conducts a simultaneous apparatus activation control process that activates a plurality of slave apparatuses at the same time with a condition that the total of voltage fluctuation caused by to-be-activated slave apparatuses is within the allowable voltage fluctuation range 44. The priority order control unit 32 repeats this simultaneous apparatus activation control process until the activation of all of the slave apparatuses SK1 to SKn is completed.

With this configuration, a greater number of the slave apparatuses SK1 to SKn can be activated at the same time within the allowable voltage fluctuation range 44, and the slave apparatuses SK1 to SKn can be activated promptly within the allowable voltage fluctuation range 44.

Further, as for the activation management network system 1, the voltage converting unit 31 of the activation control unit 20 detects the voltage of external power source at a given timing. The voltage converting unit 31, which can be used as an allowable range setting unit, sets the allowable voltage fluctuation range 44 based on the detected the voltage of external power source.

Therefore, the allowable voltage fluctuation range 44 can be updated in view of use-environment of the activation management network system 1, with which the activation control of the master apparatus MK and the slave apparatuses SK1 to SKn can be conducted more effectively.

Further, as for the activation management network system 1, the priority order control unit 32, which can be used as the activation controller, of the activation control unit 20, instructs the voltage converting unit 31, which can be used as the voltage fluctuation detector, to detect the voltage fluctuation of external power source when activating the slave apparatuses SK1 to SKn, and updates the mode-based voltage fluctuation 42 in the storage unit 40 for the slave apparatuses SK1 to SKn based on the detected voltage fluctuation of external power source.

Therefore, the mode-based voltage fluctuation 42 for each of the slave apparatuses SK1 to SKn can be updated in view of use-environment of the activation management network system 1, with which the activation control of the master apparatus MK and the slave apparatuses SK1 to SKn can be conducted more effectively.

In the above described example embodiment, the activation can be conducted promptly within the allowable fluctuation range of a power source such as external power source.

Further, in the above described example embodiment, it can check or verify whether the voltage fluctuation amplitude of the external power source is within the allowable fluctuation range of the external power source when activating one or more apparatuses connected to the same external power source, and therefore, abnormal operations of the apparatuses connected to the same external power source can be prevented.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An activation control apparatus, comprising:
a voltage fluctuation obtainer to obtain voltage fluctuation amplitude of an external power source at a given voltage, the voltage fluctuation caused when activating a first apparatus using the external power source;
a voltage fluctuation detector to detect the voltage fluctuation of the external power source at the given voltage; and
an activation controller to determine whether the voltage fluctuation amplitude obtained by the voltage fluctuation obtainer at the given voltage of the external power source, detected by the voltage fluctuation detector, is within a preset allowable voltage fluctuation range, and to control activation of the first apparatus using the external power source based on the voltage fluctuation amplitude determination made by the activation controller.

2. The activation control apparatus of claim 1, wherein the voltage fluctuation obtainer obtains the voltage fluctuation amplitude for each of a plurality of activation modes set for the first apparatus,
wherein the activation controller detects which one of the plurality of the activation modes is used for activation,
wherein the activation controller determines whether the voltage fluctuation amplitude caused by activating the activation mode at the given voltage of the external power source is within the allowable voltage fluctuation range, and controls activation of the first apparatus using the external power source based on the voltage fluctuation amplitude determination made by the activation controller.

3. The activation control apparatus of claim 2, wherein the voltage fluctuation obtainer obtains the voltage fluctuation amplitude caused by the plurality of activation modes including a full activation mode, in which power is supplied to all units of the first apparatus that require power supply, and a plurality of power-save activation modes, in which the number of units to be supplied with power increases incrementally,
wherein when activation is conducted using the power-save activation modes, the activation controller activates using a power-save activation mode with the largest power supply capacity and in which the voltage fluctuation amplitude caused by one or more of the power-save activation modes is within the allowable voltage fluctuation range.

4. The activation control apparatus of claim 1, further comprising:
an apparatus detection unit that detects a second apparatus connected to the same external power source to which the first apparatus is connected; and
an apparatus voltage fluctuation obtainer that obtains voltage fluctuation to the external power source caused by the second apparatus detected by the apparatus detection unit,
wherein the second apparatus is any one of multiple activation management target apparatuses managed by the activation controller,
wherein the activation controller controls activation of each of the activation management target apparatuses based on the voltage fluctuation amplitude of the external power source, at the given voltage, caused by each of the activation management target apparatuses obtained by the voltage fluctuation obtainer, and the allowable voltage fluctuation range.

5. The activation control apparatus of claim 4, wherein, based on a given priority order set for the activation management target apparatuses, the activation controller conducts a simultaneous apparatus activation control process that activates a plurality of the activation management target apparatuses at the same time with a condition that a total of the voltage fluctuation of to-be-activated activation management target apparatuses with a given number is within the allowable voltage fluctuation range; and repeats the simultaneous apparatus activation control process until completing activation of all of the activation management target apparatuses.

6. The activation control apparatus of claim 1, further comprising an allowable range setting unit,
wherein the activation controller instructs the voltage fluctuation detector to detect the voltage of the external power source at a given timing, and the allowable range setting unit sets the allowable voltage fluctuation range based on the detected current voltage.

7. The activation control apparatus of claim 4, wherein the activation controller instructs the voltage fluctuation detector to detect the voltage fluctuation of external power source while the activation management target apparatus is being activated, and updates the voltage fluctuation of the activation management target apparatus based on the detected voltage fluctuation of external power source.

8. An image processing apparatus for processing image data, comprising:
the activation control apparatus of claim 1 including the activation controller, which controls power supply from the external power source,
wherein the image data is processed using power supplied from the external power source under control of the activation controller.

9. A method of controlling activation of an apparatus comprising the steps of:
obtaining voltage fluctuation amplitude of an external power source at a given voltage, the voltage fluctuation caused when activating the apparatus using the external power source;
detecting the voltage fluctuation of the external power source at the given voltage;
determining whether the voltage fluctuation amplitude obtained in the obtaining step at the given voltage of the external power source, detected in the detecting step, is within a preset allowable voltage fluctuation range; and
controlling activation of the apparatus using the external power source based on the voltage fluctuation determined in the determining step.

10. A non-transitory computer-readable storage medium storing a program that, when executed by a computer having a processor, causes the computer to execute method of controlling activation of an apparatus, the method comprising the steps of:
obtaining voltage fluctuation amplitude of an external power source at a given voltage, the voltage fluctuation caused when activating the apparatus using the external power source;

detecting the voltage fluctuation of the external power source at the given voltage;

determining whether the voltage fluctuation amplitude obtained in the obtaining step at the given voltage of the external power source, detected in the detecting step, is within a preset allowable voltage fluctuation range; and controlling activation of the apparatus using the external power source based on the voltage fluctuation determined in the determining step.

\* \* \* \* \*